US008690335B2

(12) United States Patent
Okumura et al.

(10) Patent No.: US 8,690,335 B2
(45) Date of Patent: Apr. 8, 2014

(54) DISPLAY APPARATUS WHICH DISPLAYS THE FIRST IMAGE AND THE SYNTHESIZED IMAGE WITH CIRCULAR POLARIZATIONS HAVING DIFFERENT SENSES OF ROTATION FROM EACH OTHER

(75) Inventors: Fujio Okumura, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 13/129,335

(22) PCT Filed: Oct. 28, 2009

(86) PCT No.: PCT/JP2009/068490
§ 371 (c)(1),
(2), (4) Date: May 13, 2011

(87) PCT Pub. No.: WO2010/055774
PCT Pub. Date: May 20, 2010

(65) Prior Publication Data
US 2011/0221779 A1    Sep. 15, 2011

(30) Foreign Application Priority Data

Nov. 17, 2008   (JP) ................................ 2008-293333

(51) Int. Cl.
*G03B 21/00*   (2006.01)
(52) U.S. Cl.
USPC .......... 353/8; 353/7; 353/30; 353/31; 353/98; 353/122; 349/5; 349/9

(58) Field of Classification Search
USPC ......... 353/7–8, 10, 15, 20, 30–31, 84, 98–99, 353/122; 349/5, 7–9, 202, 117, 74; 348/500, 512, 563; 345/1.1, 7, 8, 32, 345/369, 649
See application file for complete search history.

(56) References Cited

U.S. PATENT DOCUMENTS

| 5,126,869 A * | 6/1992 | Lipchak et al. ................ 349/202 |
| 7,857,455 B2 * | 12/2010 | Cowan et al. .................... 353/20 |
| 7,862,185 B2 * | 1/2011 | Noba ............................. 353/119 |
| 2008/0055550 A1 * | 3/2008 | Kim ................................ 353/20 |

(Continued)

FOREIGN PATENT DOCUMENTS

| JP | 2006020204 A | 1/2006 |
| JP | 2006295304 A | 10/2006 |

(Continued)

OTHER PUBLICATIONS

International Search Report for PCT/JP2009/068490 mailed Feb. 2, 2010.

*Primary Examiner* — Sultan Chowdhury

(57) ABSTRACT

A transmitter that outputs an image signal for displaying a first image and outputs an image signal of a synthesized image made of the reversal image of the first image and a second image. A display apparatus, based on the image signals output from the transmitter, displays the first image and the synthesized image with circular polarizations having different senses of rotation from each other. A receiver includes a circular polarization selecting and transmitting means that separates the first image and the synthesized image displayed on the display apparatus, based on the sense of rotation of the circular polarization, and selectively allows the images to pass therethrough, so as to be able to photograph the first image displayed on the display apparatus.

16 Claims, 17 Drawing Sheets

(56) References Cited

U.S. PATENT DOCUMENTS

| | | | |
|---|---|---|---|
| 2009/0009719 A1* | 1/2009 | Ryf | 353/20 |
| 2009/0079941 A1* | 3/2009 | Miller et al. | 353/8 |
| 2009/0270124 A1* | 10/2009 | Yamada et al. | 455/556.1 |

FOREIGN PATENT DOCUMENTS

| | | |
|---|---|---|
| JP | 2007163233 A | 6/2007 |
| WO | 2008078630 A | 7/2008 |
| WO | 2008099737 A | 8/2008 |

* cited by examiner

DISPLAY APPARATUS WHICH DISPLAYS THE FIRST IMAGE AND THE SYNTHESIZED IMAGE WITH CIRCULAR POLARIZATIONS HAVING DIFFERENT SENSES OF ROTATION FROM EACH OTHER

This application is the National Phase of PCT/JP2009/068490, filed Oct. 28, 2009, which claims priority based on Japanese Patent Application No. 2008-293333 filed on Nov. 17, 2008, the disclosure of which is incorporated herein by reference in its entirety.

TECHNICAL FIELD

The present invention relates to a communication system for conveying information by means of an image or movie displayed on a display or the like and a receiver used in the communication system.

BACKGROUND ART

As a visible light communication technology for conveying information by means of an image or movie displayed on a display or the like, there has been a known system in which a special two-dimensional code (QR code) or the like is displayed on part of a displayed image so that the camera of a mobile phone etc., photographs the two-dimensional code to receive information.

For example, Patent Document 1 discloses a configuration which, when an anomaly is detected in a vehicle navigation system, enables visual check of fault diagnosis data by generating fault diagnosis data including an anomalous signal that indicates the anomaly, by converting the fault diagnosis data into a symbol code (bar code or two-dimensional code) to be displayed on a display apparatus, and by reading the displayed symbol code by means of a user's mobile terminal.

On the other hand, Patent Document 2 discloses a configuration that enables acquisition of various kinds of contents by reading a two-dimensional code printed on a display medium by means of a terminal device and by accessing a server apparatus specified by the data from the read two-dimensional code and by providing images, sound and other contents.

In the visible light communication technologies described above, there is the problem that if, for example, a two-dimensional code is displayed on a large-scale display used on the street, the two-dimensional code will occupy part of the image (public image) such as an advertisement etc. displayed for the public, the aesthetic appearance will be spoiled.

As a means for dealing with this problem, there is a technology called secure display, which is comprised of a display apparatus that displays a public image and an image (private image) to be provided for only special users in a time-division manner and a light shutter that makes light pass therethrough in synchronization with the display timing of the private image.

In the secure display technique, a public image provided to unspecified people, a private image provided to only specific users, and a reverse image of the private image are displayed in a time division manner in one frame by the display device and the optical shutter present in front of the users is switched to a transmission state in synchronization with display timing for the private image. With this arrangement, the user who uses the light shutter can view the private image alone whereas unspecified people (the public) who use no light shutter see the public image only because the private image is superimposed with the reversal image to produce a half-tone (gray) image.

Use of this secure display technology makes it possible to provide a variety of information using private images for the users who use the light shutter while providing public images for unspecified people without spoiling the aesthetic appearance in the public image.

However, in the secure display technology, it is necessary to use the light shutter in order to view the private image as described above. Accordingly, users who can enjoy the private image are limited. In typical visual light communications, it is desired that various kinds of information can be provided in a simpler manner for a large number of users by use of private images.

For example, when an advertisement etc. is displayed as the public image while the URL (Uniform Resource Locator) of the server equipment that provides the detail information on the product displayed by the public image is displayed by a two-dimensional code or the like, a system that requires use of the light shutter is less convenient.

Further, in the secure display technology, in order to cause the light shutter to pass through only the private image displayed on the display apparatus therethrough and block the public image and the reversal image, it is necessary to transmit a synchronization signal that synchronizes with the display of the private image, from the display apparatus to the light shutter.

However, in visual light communications, it is not always possible for the user to receive the synchronization signal because in such a case various kinds of information are acquired from the image displayed on a large-scale display that is located far away, for example. It is therefore desired to be able to provide information to users simply without using any synchronization signal, unlike the above-described secure display technology.

Further, in the secure display technology, since the public image, private image and reversal image are switched and displayed at relatively high speed, the imaging device for photographing the display image is also required to have a relatively high-speed image processing capability in order to extract the private image alone from the displayed image.

However, since the system that needs a special device to acquire the private image as described is not desirable, it is preferred that even a device that has a relatively low image processing capability as, for example a built-in camera of a mobile phone, acquire the private image.

CITATION LIST

Patent Document

[Patent Document 1] Japanese Patent Laid-Open No. 2007-163233
[Patent Document 2] Japanese Patent Laid-Open No. 2006-020204A

SUMMARY

It is therefore an object of the present invention to provide a communication system that can perform visible light communication by use of a simple means without spoiling any aesthetic appearance of the public image displayed on the display apparatus, and a receiver for use in the communication system.

In order to achieve the above described object, the exemplary aspect of the communication system of the present invention includes:

a transmitter that outputs an image signal for displaying a first image and outputs an image signal of a synthesized image made of the reversal image of the first image and a second image;

a display apparatus that, based on the image signals output from the transmitter, displays the first image and the synthesized image with circular polarizations having different senses of rotation from each other; and, a receiver including a circular polarization selecting and transmitting means that separates the first image and the synthesized image displayed on the display apparatus, based on the sense of rotation of the circular polarization, and selectively allows the images to pass therethrough, so as to be able to photograph the first image displayed on the display apparatus.

On the other hand, the exemplary aspect of the receiver of the present invention is a receiver that images a first image, and a synthesized image made of the reversal image of the first image and a second image, displayed on a display apparatus with circular polarizations having different senses of rotation from each other and acquires the first image, comprising:

a ¼ wave plate that converts the circular polarizations of the first image and the synthesized image displayed on the display apparatus into linear polarizations; and, a polarizing plate that passes through the linear polarization corresponding to the circular polarization of the first image alone.

Another exemplary aspect of the receiver is a receiver that photographs a first image, and a synthesized image made of the reversal image of the first image and a second image, displayed on a display apparatus with circular polarizations having different senses of rotation from each other to acquire the first image, comprising:

a ¼ wave plate that converts the circular polarizations of the first image and the synthesized image displayed on the display apparatus into linear polarizations;

a liquid crystal cell that switches the polarization direction for linear polarizations having passed through the ¼ wave plate, depending on the state of voltage being applied or the state of no voltage being applied;

a polarizing plate that passes through only the linear polarization corresponding to the circular polarization of the first image having passed through the liquid crystal cell, or passes through both the linear polarization corresponding to the circular polarization of the first image and the linear polarization corresponding to the circular polarization of the synthesized image; and, a switching controller that applies a predetermined voltage to the liquid crystal cell.

Still another the exemplary aspect of the receiver is a receiver that photographs a first image, and a synthesized image made of the reversal image of the first image and a second image, displayed on a display apparatus with circular polarizations having different senses of rotation from each other to acquire the first image, comprising:

a liquid crystal cell that passes through the first image and the synthesized image displayed on the display apparatus therethrough without changing the states of polarization, or converts the circular polarizations of the first image and the synthesized image displayed on the display apparatus to linear polarizations, depending on the state of voltage being applied or the state of no voltage being applied;

a polarizing plate that passes through only the linear polarization corresponding to the circular polarization of the first image having passed through the liquid crystal cell, or passes through both the linear polarization corresponding to the circular polarization of the first image and the linear polarization corresponding to the circular polarization of the synthesized image; and, a switching controller that applies a predetermined voltage to the liquid crystal cell.

BRIEF DESCRIPTION OF THE DRAWINGS

FIG. 1 is a schematic diagram showing one configurational example of a communication system of the first exemplary embodiment.

FIG. 2 is a schematic diagram showing one configurational example of a network system using the communication system shown in FIG. 1.

FIG. 3 is a block diagram showing one configurational example of a display apparatus and a transmitter shown in FIG. 1.

FIG. 4 is a block diagram showing another configurational example of a display apparatus and a transmitter shown in FIG. 1.

FIG. 5 is a block diagram showing one configurational example of a receiver included in the communication system of the first exemplary embodiment.

FIG. 6 is a schematic diagram showing a configurational example of a moving mechanism shown in FIG. 5.

FIG. 7 is a schematic diagram showing another configurational example of a moving mechanism shown in FIG. 5.

FIG. 8 is a schematic diagram showing another configurational example of a moving mechanism shown in FIG. 5.

FIG. 9 is a block diagram showing one configurational example of a receiver included in the communication system of the second exemplary embodiment.

FIG. 10 is a timing chart showing an operational example of a receiver shown in FIG. 9.

FIG. 11 is a timing chart showing an operational example of a receiver shown in FIG. 9.

FIG. 12 is a timing chart showing an operational example of a receiver shown in FIG. 9.

FIG. 13 is a timing chart showing an operational example of a receiver shown in FIG. 9.

FIG. 14 is a timing chart showing an operational example of a receiver shown in FIG. 9.

FIG. 15 is a timing chart showing an operational example of a receiver according to the third exemplary embodiment.

FIG. 16 is a timing chart showing an operational example of a receiver according to the third exemplary embodiment.

FIG. 17 is a block diagram showing one configurational example of a receiver included in the communication system of the fourth exemplary embodiment.

EXEMPLARY EMBODIMENT

Next, the present invention will be described with reference to the drawings.
(The First Exemplary Embodiment)

Figure 1:
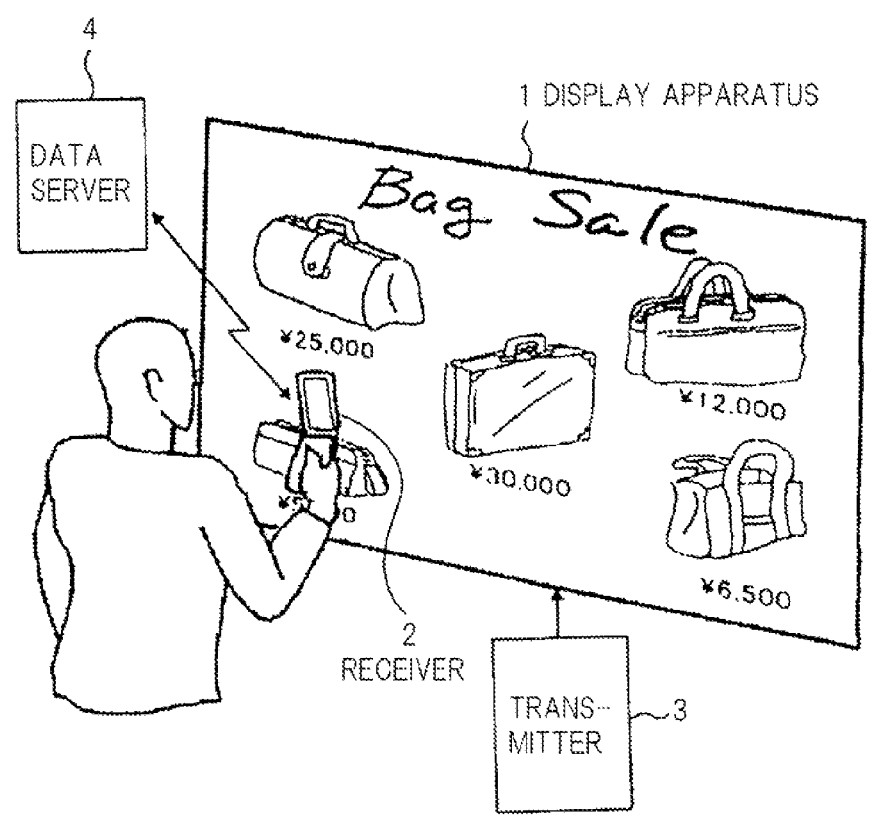
[FIG. 1]
Figure 2:
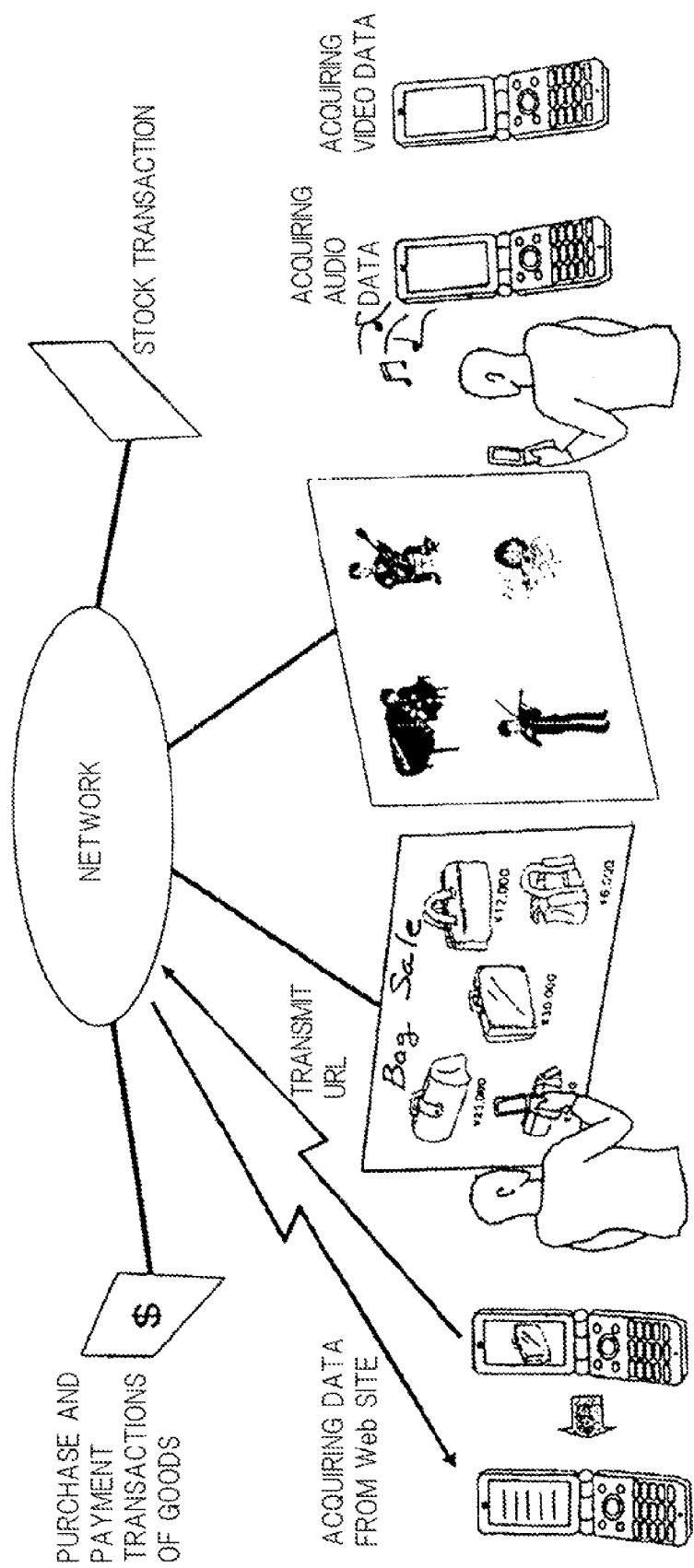
[FIG. 2]

FIG. 1 is a schematic diagram showing one configurational example of a communication system of the first exemplary embodiment. FIG. 2 is a schematic diagram showing one configurational example of a network system using the communication system shown in FIG. 1.

As shown in FIG. 1, the communication system of the first exemplary embodiment includes: display apparatus 1 displaying a public image, a private image and its reversal image; transmitter 3 outputting image signals for displaying each image on display apparatus 1; receiver 2 owned by a user for acquiring the public image or the private image from the image displayed on display apparatus 1; and data server 4 transmitting data of various kinds of content to receiver 2 by means of a well-known communication means.

Transmitter 3 can be realized by an A/D converter for processing image signals, CPU, DSP, logical operation circuit or the like implementing processing in accordance with programs. Display apparatus 1 may employ a projector apparatus of a liquid crystal type, DLP type, etc., direct-view type LCD (Liquid Crystal Display), PDP (Plasma Display Panel), and the like.

Receiver 2 may use a mobile phone, PDA (Personal Digital Assistant) or a mobile terminal device such as a note-book type personal computer etc., equipped with a camera for photographing images.

Data server 4 can be realized by a computer including a CPU that executes processing in accordance with programs.

As shown in FIG. 1, the user who is using the communication system of the present exemplary embodiment directs an unillustrated camera of receiver 2 toward the displayed image of display apparatus 1 to photograph the public image while viewing the public image displayed on the display portion of receiver 2. At this point, the image to be photographed may be the whole of the public image or part of the public image. By this operation, the user is able to display the public image or the partial image of it (e.g., a product displayed for advertisement) on receiver 2. The user can also display the private image that is located at position at which the public image was photographed, on receiver 2. Further, the user is able to acquire various kinds of content provided through the private image, by means of receiver 2. For example, when the private image acquired by receiver 2 is access data of a two-dimensional code or the like directed to data server 4, it is possible to acquire the data of various kinds of content from data server 4 by exchanging information with data server 4 based on the access data.

Here, since it is assumed in the communication system shown in FIG. 1 that the private image is used to provide various kinds of content from data server 4 to the user, the configurational example including data server 4 that transmits the data of the contents to receiver 2 is shown. When the private image alone is provided to the user, data server 4 does not need to be included.

As shown in FIG. 2, the communication system shown in FIG. 1 is connected to a network such as the internet etc., so as to be able to realize a network system that provides various kinds of content and information services to users.

In this network system, when the private image is of URL data using, for example a two-dimensional code or the like, the user obtains the URL by decoding the two-dimensional code by means of receiver 2 and acquires the data of various kinds of content from the server equipment (web site) designated by the URL through the network such as the Internet etc.

When the private image is, for example a movie, the user is able to acquire video data such as video clips etc. using receiver 2, and can also acquire audio data (including music etc.) displayed by a two-dimensional code or the like.

Further, when confidential, private image data is used, it is possible to provide various kinds of information services such as online purchase and payment transactions of goods, stock transactions and the like, to users.

Now, display apparatus 1, transmitter 3 and receiver 2, which form the communication system shown in FIG. 1 and the network system shown in FIG. 2 will be described with reference to the drawings.

In the communication system of the present exemplary embodiment, similarly to the above-described secure display technology, a public image, a private image and the reversal image of the private image are displayed on display apparatus 1 so as to provide the public image to unspecified people who are viewing display apparatus 1 with the naked eye and to provide the private image to particular users who have receiver 2.

In the communication system of the present exemplary embodiment, the public image and the reversal image are synthesized, and the synthesized image is displayed on display apparatus 1 by using one polarization, and the private image is displayed on display apparatus 1 by using the other polarization. Also, in the communication system of the present exemplary embodiment, receiver 2 extracts the private image or the public image from the image displayed on display apparatus 1 by using a well-known polarization separating technique. When two linear polarizations orthogonal to each other are used as the polarized light to be used for image display, there occurs a case where these two linear polarizations cannot be separated when receiver 2 is tilted. Accordingly, in the present exemplary embodiment, two circular polarizations (right circular polarization and left circular polarization) having different senses of rotation are used.

Figure 3:
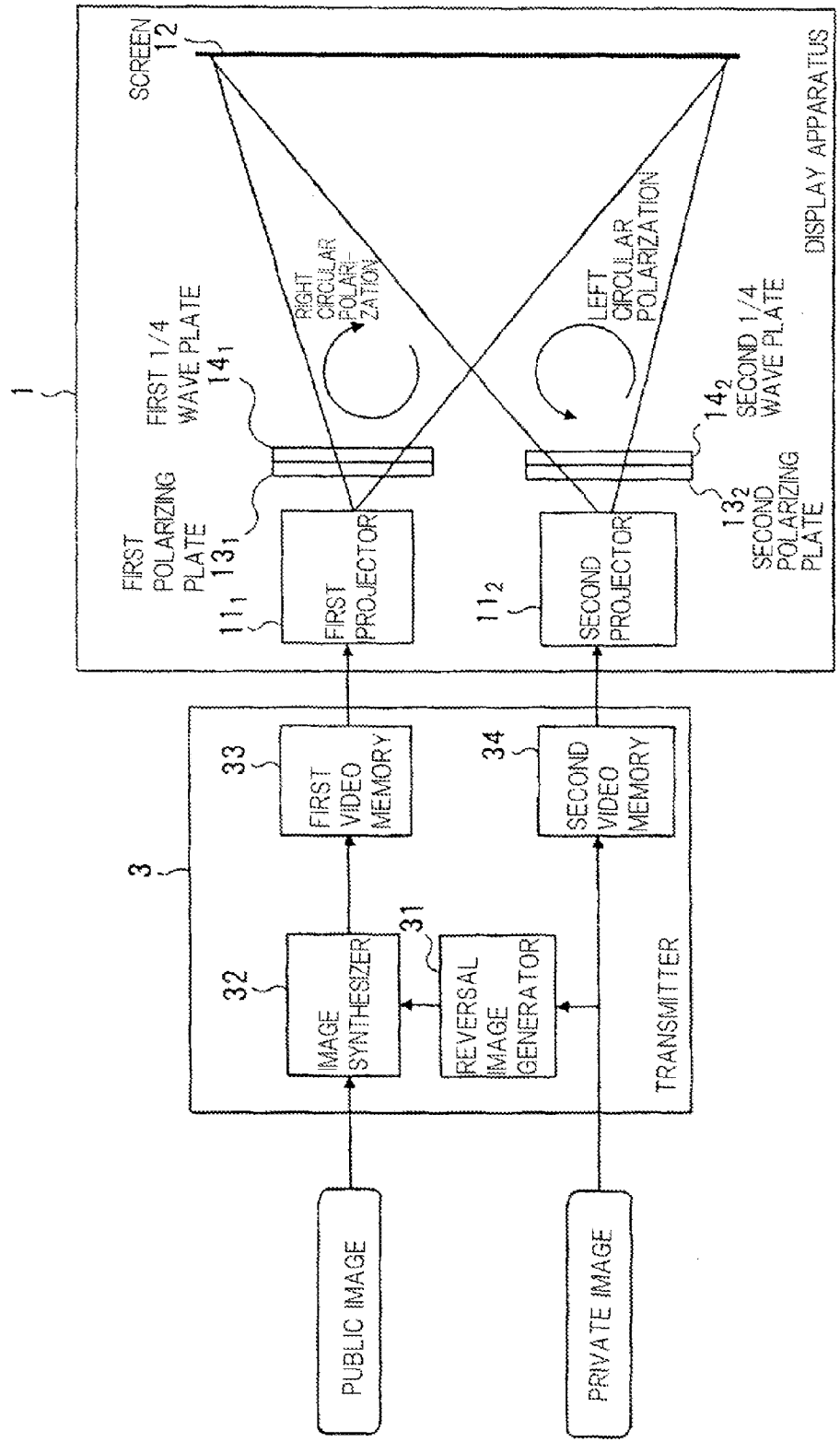
[FIG. 3]
Figure 4:
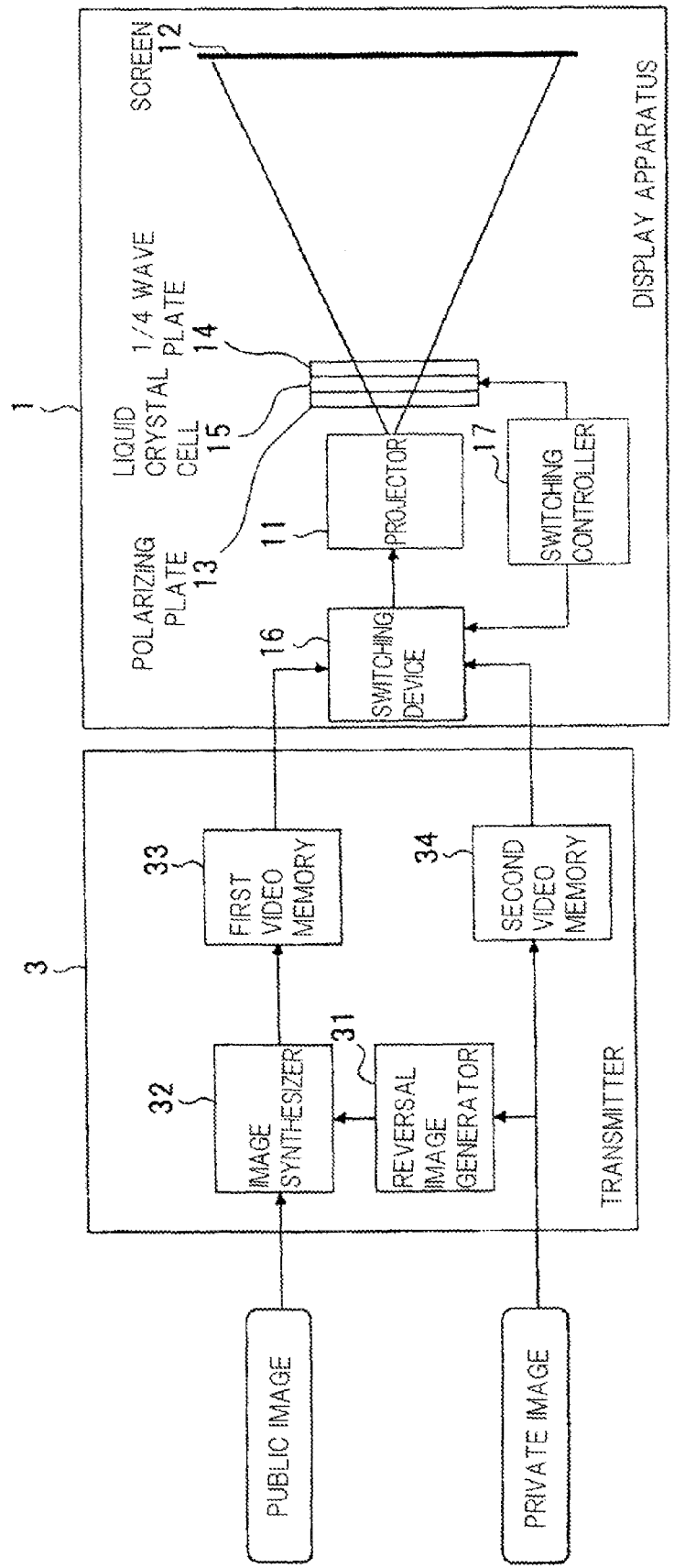
[FIG. 4]

FIG. 3 is a block diagram showing one configurational example of the display apparatus and transmitter shown in FIG. 1. FIG. 4 is a block diagram showing another configurational example of the display apparatus and transmitter shown in FIG. 1. FIG. 3 is an example including display apparatus 1 and two projectors. FIG. 4 is an example including display apparatus 1 and one projector.

Transmitter 3 shown in FIG. 3 includes reversal image generator 31, image synthesizer 32, first video memory 33 and second video memory 34. Display apparatus 1 shown in FIG. 3 includes first projector $11_1$, second projector $11_2$, screen 12, first polarizing plate $13_1$, second polarizing plate $13_2$, first ¼ wave plate $14_1$ and second ¼ wave plate $14_2$.

Reversal image generator 31 generates an image signal of the reversal image based on the image signal of the private image. Generated as the reversal image is an image that produces uniform half-tone (gray) throughout the frame when the luminance of the image is added to that of the private image every pixel. In general, the tone levels of an image signal have been prepared by non-linear γ-correction in accordance with the γ-characteristic of the display apparatus. Accordingly, the image signal of the private image is converted into that with linear luminance values and the reversal image is generated based on the luminance values of the converted private image. For example, when the white displayed on display apparatus 1 has a tone level of 255, the value obtained by subtracting from 255 the luminance value of the private image that has been converted into liner luminance, produces the luminance value of the reversal image.

Image synthesizer 32 synthesizes the image signal of the public image and the image signal of the reversal image generated by reversal image generator 31 to output the image signal of the synthesized image. The image signal of the synthesized image is generated by summing up the luminance value of the public image and the luminance value of the reversal image for every pixel. However, if the luminance value of the public image and the luminance value of the reversal image are simply added up, the image signal after synthesizing will exceed the maximum processable value of transmitter 1.

To avoid this, image synthesizer 32 calculates the luminance value of the reversal image for synthesizing by converting the luminance value of the private image to half the value first, then subtracting the luminance value of the private image after conversion from the luminance value that tints the screen of display apparatus 1 with the half-tone (gray) (50% of the maximum luminance value). Next, image synthesizer 32 converts the luminance value of the public image to the halved value, and adds the luminance value of the reversal image for synthesizing to the luminance value of the public image after conversion to thereby generate image signal of the synthesized image. Finally, image synthesizer 32 applies nonlinear γ-correction on the generated image signal of the synthesized image in accordance with the γ-characteristic of display apparatus 1.

The luminance value of the half-tone (gray) to be used for generation of the reversal image for synthesizing may be set at a value lower than 50% of the maximum luminance value. In this case, the contrast of the public image on the screen that unspecified people (the public) view is improved.

The above operating process is performed by an A/D converter included in the above-described transmitter 3, a CPU, DSP or logical operation circuit or the like that executes processing in accordance with programs.

First video memory 33 stores the image signal of the synthesized image as image data. Second video memory 34 stores the image signal of the private image as image data.

First projector 11$_1$ performs projection display of the synthesized image made of the public image and the reversal image on screen 12 in accordance with the image data stored in first video memory 33. Second projector 11$_2$ performs projection display of the private image on screen 12 in accordance with the image data stored in second video memory 34.

First polarizing plate 13$_1$ passes through linearly polarized light having a predetermined polarization direction, among the image light emitted from first projector 11$_1$. Second polarizing plate 13$_2$ passes through a linear polarization having a polarization direction orthogonal to the linear polarization passing through first polarizing plate 13$_1$, among the image light emitted from second projector 11$_2$.

First ¼ wave plate 14$_1$ converts the linear polarization of the image light having passed through first polarizing plate 13$_1$ into a right circular polarization, for example. Second ¼ wave plate 14$_2$ converts the linear polarization of the image light having passed through second polarizing plate 13$_2$ into a left circular polarization, for example. FIG. 3 shows an example where first polarizing plate 13$_1$ and first ¼ wave plate 14$_1$ projects the image light of right circular polarization while second polarizing plate 13$_2$ and second ¼ wave plate 14$_2$ projects the image light of left circular polarization. In the present exemplary embodiment, it is operational as long as the senses of rotation of the image light projected by first projector 11$_1$ and the image light projected by second projector 11$_2$ are different from each other. It is still operational when the senses of rotation are opposite to each other.

In the above configuration, the synthesized image emitted from first projector 11$_1$ and the private image emitted from second projector 11$_2$ are projected simultaneously on screen 12. Accordingly, the private image is superimposed over its reversal image, hence perceived as a half-tone (gray) image and the public image alone is viewed by unspecified people (the public) who view the image projected on screen 12 with the naked eye.

Here, when first projector 11$_1$ and second projector 11$_2$ are a liquid crystal type projector apparatus, the polarizing plate incorporated in the liquid crystal type projector apparatus may be made to serve as first polarizing plate 13$_1$ and second polarizing plate 13$_2$. In this case, when, for example, the linear polarization emitted from one of the liquid crystal type projector apparatuses is rotated 90 degrees using, for example a ½ wave plate, it is possible to establish an orthogonal relationship between the linear polarization emitted from first projector 11$_1$ and the linear polarization emitted from second projector 11$_2$. When the polarizing plates incorporated in the liquid crystal type projector apparatuses are made to serve as first polarizing plate 13$_1$ and second polarizing plate 13$_2$, it is also possible to establish an orthogonal relationship between the directions of polarization of the synthesized image and the private image using other phase-difference plates than the aforementioned ½ wave plate.

In the case where a direct-view type LCD, PDP or the like is used as display apparatus 1, it is possible to display the synthesized image and the private image which each have a different polarization direction from the other, simultaneously, by providing a polarizing plate and a ¼ wave plate having phase elements arranged stripe-wise or checker-wise arranged correspondingly to pixels, in front of the panel for image display. In this case, the polarizing plate incorporated in the direct-view type LCD may be used as polarizing plate 13.

Display apparatus 1 shown in FIG. 4 includes switching device 16, projector 11, screen 12, polarizing plate 13, liquid crystal cell 15, ¼ wave plate 14 and switching controller 17. Transmitter 3 shown in FIG. 4 has the same configuration as that of the transmitter 3 shown in FIG. 3, so that its description is omitted.

Switching device 16, in accordance with a control signal transmitted from switching controller 17, outputs the image data of the synthesized image stored in first video memory 33 or the image data of the private image stored in second video memory 34 in a time-division manner. On this occasion, in order to prevent the public image viewed by unspecified people (public) from flickering, switching device 16 preferably outputs data by switching image data between that of the synthesized image and that of the private image within, at least, one frame (e.g., 60 Hz). That is, it is preferable that switching device 16 outputs image data by performing time-division at a rate equal to or greater than two times of one frame.

Projector 11 projects and displays the synthesized image or private image on screen 12 in accordance with the image data output from switching device 16.

Polarizing plate 13 passes through linear polarization of a predetermined polarization direction among the image light emitted from projector 11. Liquid crystal cell 15 is controlled by switching controller 17 so as to be on (the state in which voltage is applied) or off (the state in which no voltage is applied), to thereby rotate 90 degrees the polarization direction of the linearly polarized light that has passed through polarizing plate 13. In this way, the polarization direction of the linearly polarized light having passed through polarizing plate 13 is switched by liquid crystal cell 15, whereby the sense of rotation of the circular polarization emitted from ¼ wave plate 14 is changed over.

Switching controller 17 turns on and off liquid crystal cell 15 in synchronization with the image data of the synthesized image, and the image data of the private image, output from switching device 16, to thereby display the synthesized image and the private image in which each have a different polarization direction from the other, on screen 12 in a time-division manner, within one frame (e.g., 60 Hz).

Also with transmitter 3 and display apparatus 1 shown in FIG. 4, unspecified people (public) who are viewing the image projected on screen 12 with the naked eye, see the public image only because the private image is superimposed with its reversal image, forming a half-tone (gray) image.

In the case where a direct-view type LCD or the like is used as display apparatus 1, similarly to display apparatus 1 shown in FIG. 4, polarizing plate 13, liquid crystal cell 15 and ¼ wave plate 14 may be arranged in front of the liquid crystal panel for displaying images while liquid crystal cell 15 is turned on/off in synchronization with the synthesized image and the private image displayed on the liquid crystal panel, to thereby display the synthesized image and private image, in which each have a different polarization direction from the other, in a time-division manner.

The polarizing plate incorporated in the direct-view type LCD may be used as polarizing plate 13. When the polarizing plate incorporated in the direct-view type LCD is made to serve as polarizing plate 13, a phase-difference plate such as a ½ wave plate or the like can be used together to form an orthogonal relationship between the directions of polarization of the synthesized image and the private image.

Next, receiver 2 shown in FIG. 1 will be described with reference to the drawings.

Figure 5:
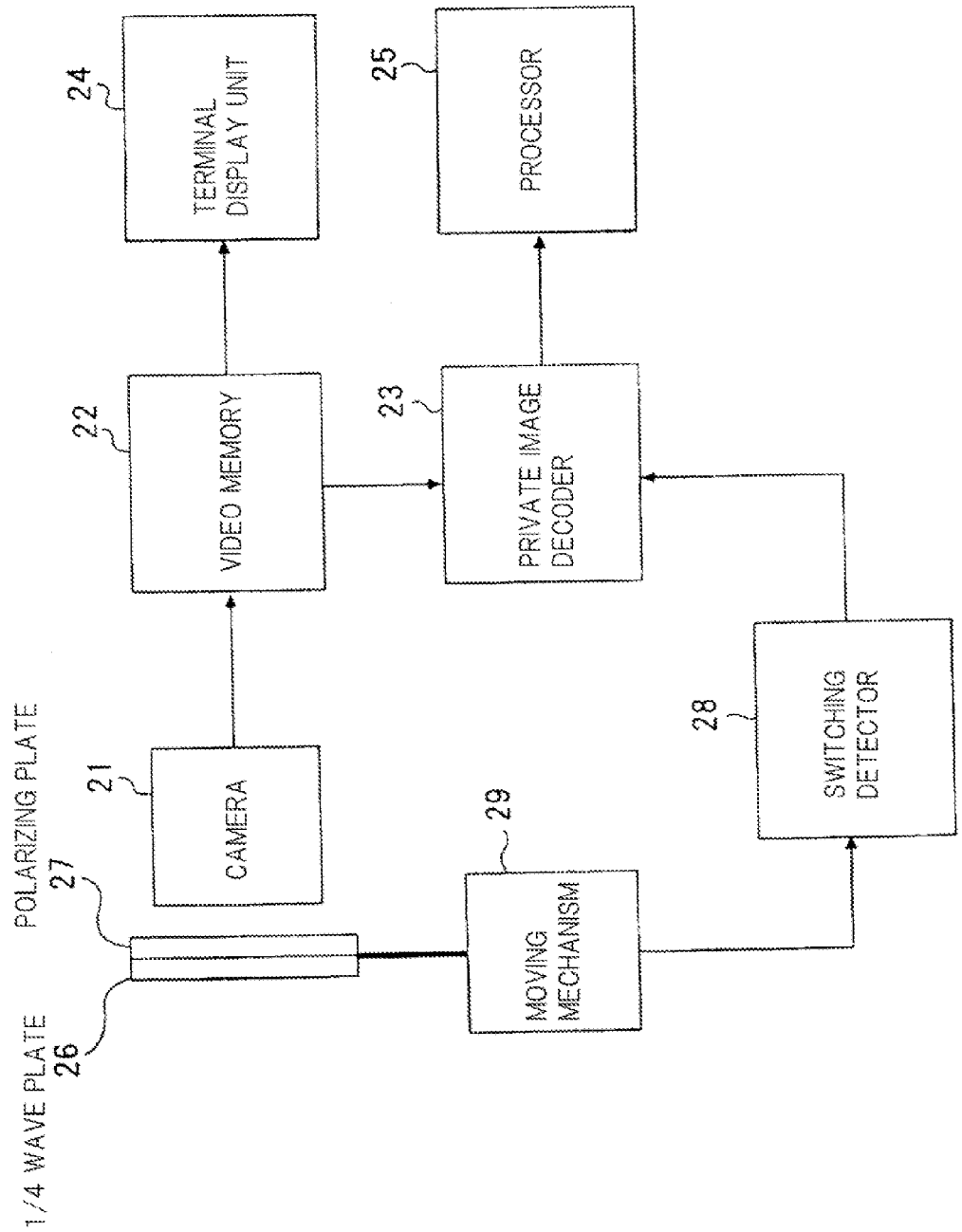
[FIG. 5]
Figure 6:
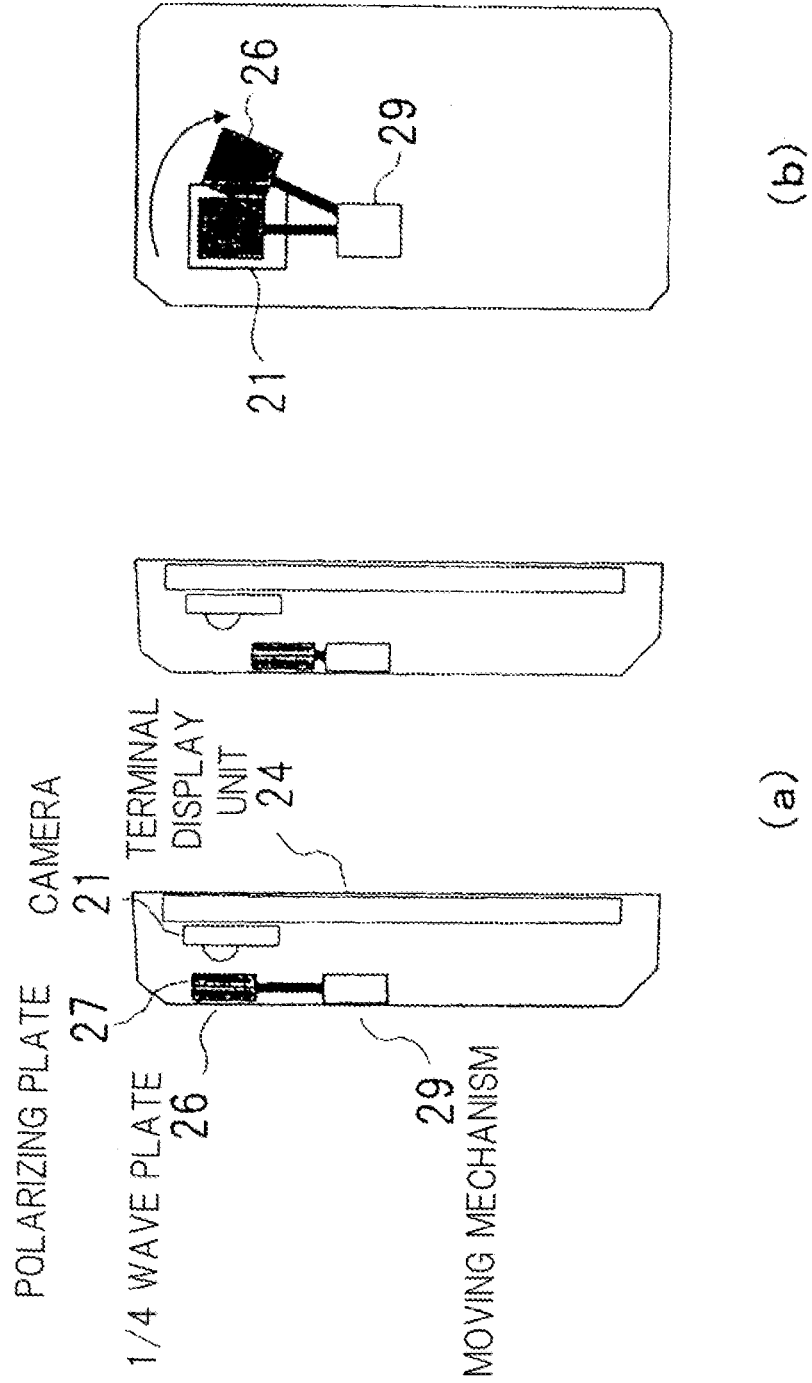
[FIG. 6]
Figure 7:
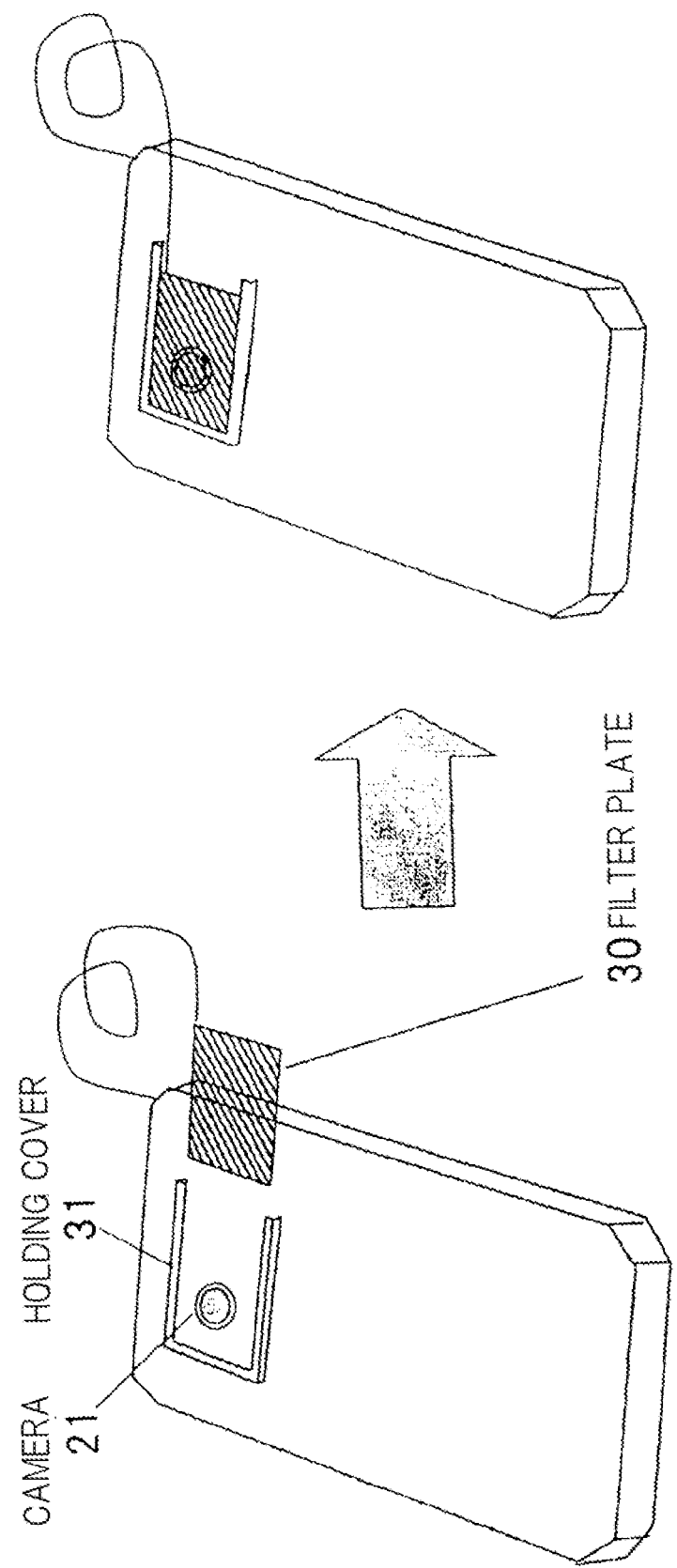
[FIG. 7]
Figure 8:
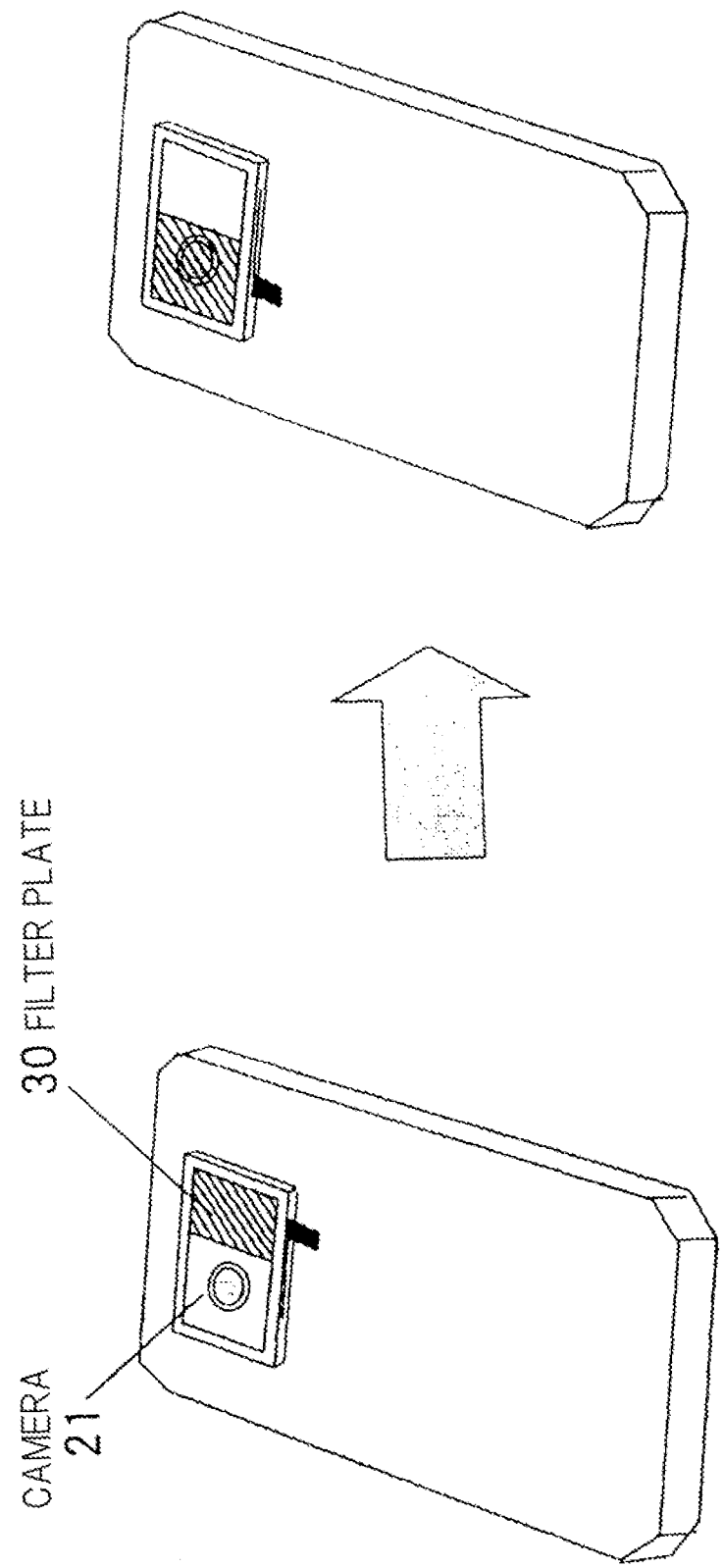
[FIG. 8]

FIG. 5 is a block diagram showing one configurational example of a receiver included in the communication system of the first exemplary embodiment. FIG. 6 is a schematic diagram showing a configurational example of a moving mechanism shown in FIG. 5. FIGS. 7 and 8 are schematic diagrams showing other configurational examples of the moving mechanism shown in FIG. 5.

As shown in FIG. 5, receiver 2 of the first exemplary embodiment includes camera 21, video memory 22, private image decoder 23, terminal display unit 24, processor 25, ¼ wave plate 26, polarizing plate 27, switching detector 28 and moving mechanism 29.

Camera 21 photographs the image displayed on display apparatus 1 and outputs the image to video memory 22.

Video memory 22 accumulates the image signal output from camera 21 as image data.

Terminal display unit 24 displays the public image or the private image ins accordance with the image data output from video memory 22.

Private image decoder 23 executes the necessary signal processing on the image signal of the private image photographed by camera 21. For example, when the private image photographed by camera 21 is a two-dimensional code, private image decoder 23 decodes the two-dimensional code.

Processor 25, based on the result of the signal processing at private image decoder 23, acquires various kinds of content data such as audio (inclusive of music etc.) data, text data, image data, movie data, etc., from a network, or data server 4 by means of an unillustrated communicating means. When, for example, a URL is obtained from the result of processing at private image decoder 23, processor 25, by using an unillustrated communicating means, acquires various kinds of content data from the server equipment or the like inside the network that is designated by the URL. Further, when access data to data server 4 is acquired from the result of the processing at private image decoder 23, various kinds of content data are obtained from data server 4 by means of an unillustrated communicating means. The acquired audio data, text data, image data, movie data, etc., are stored in an unillustrated memory or the like.

Quarter wave plate 26 and polarizing plate 27 are disposed so as to be moved to either a position where the plates cover an unillustrated light receiver (lens) of camera 21 or a position where the plates do not cover the light receiver.

Switching detector 28 detects whether ¼ wave plate 26 and polarizing plate 27 have moved to the position where the light receiver of camera 21 is covered or have moved to the position where the light receiver is not covered. Here, it is not always necessary to detect the position of ¼ wave plate 26 and polarizing plate 27 by switching detector 28. For example, the user of receiver 2 may input the position of ¼ wave plate 26 and polarizing plate 27 into receiver 2 by operating a predetermined switch.

As moving mechanism 29, a mechanism that enables ¼ wave plate 26 and polarizing plate 27 to move in the vertical direction as shown in FIG. 6(a), or a mechanism that enables ¼ wave plate 26 and polarizing plate 27 to rotate as shown in FIG. 6(b), may be considered.

Alternatively, since receiver 2 of the first exemplary embodiment is operable when ¼ wave plate 26 and polarizing plate 27 are moved by user operation, moving mechanism 29 may be comprised of holding cover 31 that fixes filter plate 30 integrally formed of ¼ wave plate 26 and polarizing plate 27, in front of camera 21, as shown in FIGS. 7 and 8.

Holding cover 31 shown in FIG. 7 is an example in which filter plate 31 is removably held. Holding cover 31 shown in FIG. 8 is an example in which filter plate 30 is held slidably.

In the communication system of the present exemplary embodiment, as shown in FIG. 3, for example, the synthesized image made of the public image and the reversal image is displayed on screen 12 of display apparatus 1 with a right circular polarization, at the same time, the private image is displayed with a left circular polarization.

Quarter wave plate 26 included in receiver 2 shown in FIG. 5 converts the right circular polarization and left circular polarization into two linear polarizations orthogonal to each other. Polarizing plate 27 included in receiver 2 shown in FIG. 5 is arranged so as to pass through the linear polarization corresponding to the left circular polarization only and block the linear polarization corresponding to the right circular polarization. Accordingly, ¼ wave plate 26 and polarizing plate 27 pass through the private image only and block the synthesized image. Similarly, even when display apparatus 1 is configured to display the synthesized image and the private image in a time-division manner (see FIG. 4), ¼ wave plate 26 and polarizing plate 27 pass through the private image only and block the synthesized image.

Accordingly, when ¼ wave plate 26 and polarizing plate 27 are moved to such a position as to cover the light receiver of camera 21, receiver 2 is able to photograph the private image only, from the image displayed on display apparatus 1, by means of camera 21. Receiver 2 can also display the private image photographed by camera 21, on terminal display unit 24. In this case, when a notice of the private image photographing mode being active is given to private image decoder 23 via switching detector 28, private image decoder 23 can implement the necessary signal processing on the image signal of the private image photographed by camera 21.

On the other hand, when ¼ wave plate 26 and polarizing plate 27 have been moved to a position so as not to cover the light receiver of camera 21, camera 21 integrates light incident thereon for a certain period so that the private image is superimposed with its reversal image, resulting in a half-tone (gray) image. Accordingly, of the synthesized image made of the public image and the reversal image, and the private image, photographed by camera 21, the public image alone is displayed on terminal display unit 24.

According to the communication system of the first exemplary embodiment, since the synthesized image and the private image are displayed on display apparatus 1 simultaneously or in a time-division manner using circular polarizations each having a different sense of rotation from the other, the private image is superimposed with its reversal image, resulting in a half-tone (gray) image so that the public image alone is recognized by unspecified people who are viewing display apparatus 1 with the naked eye. Accordingly, there is no risk of spoiling aesthetic appearance of the public image displayed on display apparatus 1. Further, since movable arrangement of ¼ wave plate 26 and polarizing plate 27 in receiver 2 enables camera 21 to photograph the public image or private image alone, it is possible to simply acquire the private image corresponding to the photographed position of the public image from the image displayed on display apparatus 1 without using any synchronization signal. Accordingly, it is possible to achieve visible light communication with simple means.

(The Second Exemplary Embodiment)

Next, the second exemplary embodiment of the present invention will be described with reference to the drawings.

In the above-described communication system of the first exemplary embodiment, the public image is acquired by receiver 2 when the user moves ¼ wave plate 26 and polarizing plate 27 to a position where the light receiver of the camera is not covered, whereas the private image is acquired by receiver 2 when the user moves ¼ wave plate 26 and polarizing plate 27 to a position where the light receiver of camera 21 is covered. Accordingly, in receiver 2 of the first exemplary embodiment, when receiver 2 is made to display the public image, it is relatively difficult to switch the display to the private image while keeping its posture.

The second exemplary embodiment proposes receiver 2 that can switch the display between the public image and the private image in a simpler manner. Display apparatus 1, transmitter 3 and data server 4 included in the communication system of the second exemplary embodiment have the same configurations and operations as those of the first exemplary embodiment, so that the description is omitted.

Figure 9:
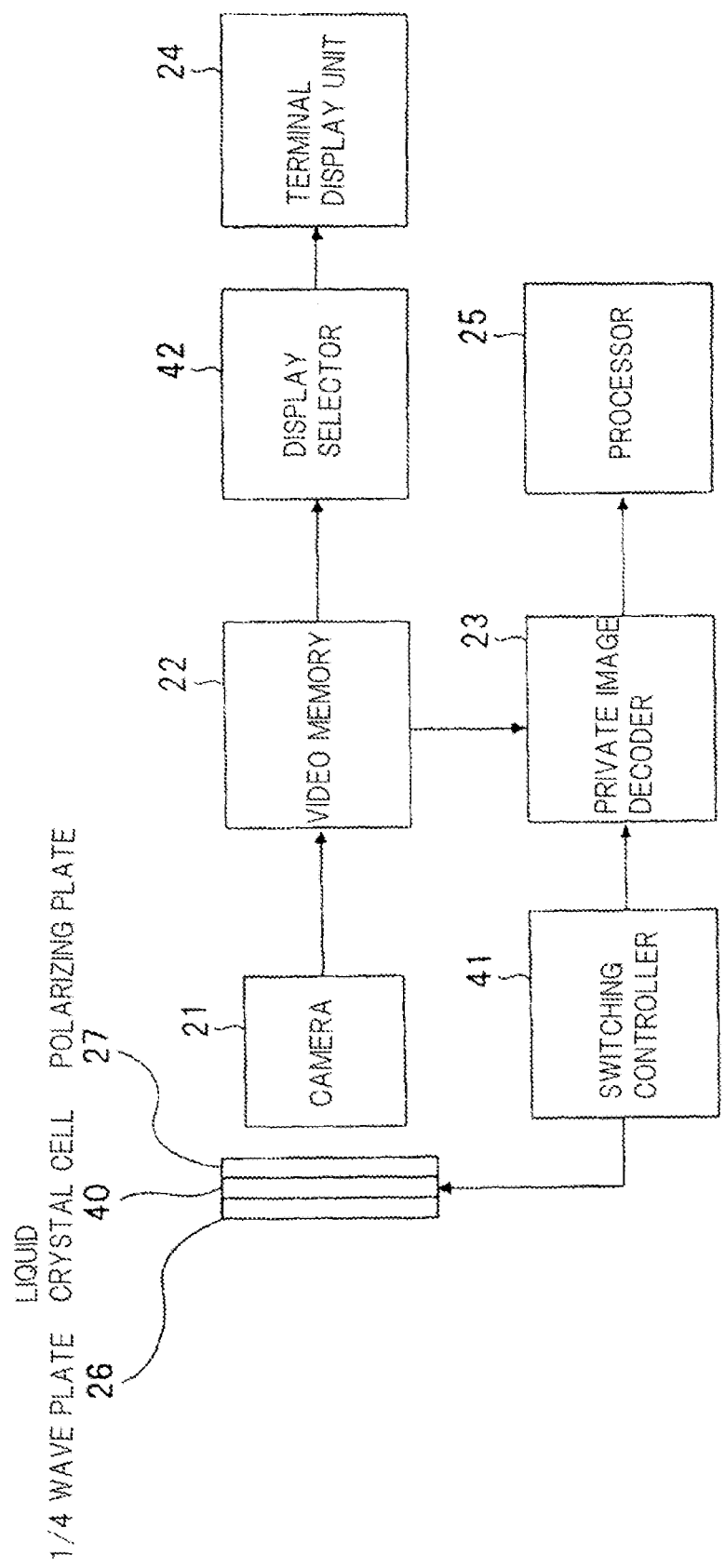
[FIG. 9]

FIG. 9 is a block diagram showing one configurational example of a receiver included in the communication system of the second exemplary embodiment.

As shown in FIG. 9, receiver 2 of the second exemplary embodiment includes camera 21, video memory 22, private image decoder 23, display selector 42, terminal display unit 24, processor 25, ¼ wave plate 26, polarizing plate 27, liquid crystal cell 40 and switching controller 41.

Since camera 21, video memory 22, private image decoder 23, terminal display unit 24 and processor 25 included in receiver 2 of the second exemplary embodiment shown in FIG. 9 have the same configurations and operations as those of receiver 2 of the first exemplary embodiment shown in FIG. 5, the description is omitted.

As shown in FIG. 9, receiver 2 of the second exemplary embodiment has a configuration in which ¼ wave plate 26, liquid crystal cell 40 and polarizing plate 27 are laid out at such a position as to cover the light receiver of camera 21.

Quarter wave plate 26 converts the right circular polarization and left circular polarization of the image displayed on display apparatus 1 into two linear polarizations orthogonal to each other. Liquid crystal cell 40 is made of TN (Twisted Nematic) type liquid crystal and switches the polarization direction of the linearly polarized light having passed through ¼ wave plate 26, depending on either the state (off) where no voltage is applied or the state (on) where voltage is applied. Polarizing plate 27, depending on the state of liquid crystal cell 40, passes through the linearly polarized light corresponding to the circular polarization of the private image that has passed through liquid crystal 40, alone, passes through the linearly polarized light corresponding to the circular polarization of the private image and the linearly polarized light corresponding to the circular polarization of the synthesized image by halved luminance, respectively, or passes through the linearly polarized light corresponding to the circular polarization of the synthesized image, alone.

Switching controller 41 turns off liquid crystal 40 (the state in which no voltage is applied) or turns on liquid crystal 40 (the state in which voltage is applied) in accordance with user control through an unillustrated input key, so as to change the liquid crystal alignment, whereby the polarization direction of the linearly polarized light that has passed through ¼ wave plate 26 are changed. Here, liquid crystal cell 40 of the present exemplary embodiment is assumed to pass through the incident light by rotating its polarization direction 90 degrees when the cell is turned off, pass through the incident light by rotating its polarization direction 45 degrees when the cell is turned on with the application of a medium voltage, and pass through the incident light without rotating its polarization direction when the cell is fully turned on with the application of a high enough voltage.

In receiver 2 of the present exemplary embodiment, the polarizing direction of polarizing plate 27 is adjusted so as to transmit only the linear polarization corresponding to the circular polarization of the private image that has passed through liquid crystal cell 40 when liquid crystal cell 40 is off. Switching controller 41 applies voltage to liquid crystal cell 40 when liquid crystal cell 40 is turned on so that the linear polarization corresponding to the circular polarization of the private image and the linear polarization corresponding to the circular polarization of the synthesized image will pass through polarizing plate 27 by halved luminance, respectively, or only the linear polarization corresponding to the circular polarization of the synthesized image will pass through polarizing plate 27. In this way, switching controller 41 controls the amount of rotation of linearly polarized light by liquid crystal cell 40 by changing the voltage applied to liquid crystal cell 40.

Display selector 42 selects the image data of the image (private image, public image) to be displayed on terminal display unit 24 in accordance with user control.

In this configuration, liquid crystal cell 40 passes through two linear polarizations that have passed through ¼ wave plate 26 and that are orthogonal to each other by rotating each polarization direction 90 degrees. Polarizing plate 27 passes through only the linear polarization corresponding to the circular polarization of the private image, from among the linearly polarized light that has passed through liquid crystal cell 40. Accordingly, camera 21 of receiver 2 is able to photograph the private image alone. In this case, when a notice of the private image photographing mode being active is given to private image decoder 23 from switching controller 41, private image decoder 23 implements the necessary signal processing on the image signal of the private image photographed by camera 21. Further, when the user selects the private image by display selector 42, the private image is displayed on terminal display unit 24 of receiver 2.

On the other hand, when fully turned on, liquid crystal cell 40 passes through the two linear polarizations that are orthogonal to each other and that have passed through ¼ wave plate 26, without rotating their polarization directions. In this case, since polarizing plate 27 will not pass through the linear polarization corresponding to the circular polarization of the private image, camera 21 of receiver 2 photographs the synthesized image, i.e., the public image superimposed with the reversal image. Accordingly, it is impossible to display the public image alone on terminal display unit 24 without photographing any measure.

To deal with this, in the present exemplary embodiment, for example, half the voltage at which the liquid crystal cell 40 is fully turned on is applied from switching controller 41 to liquid crystal cell 40, so as to set the amount of rotation by which the polarization direction of the incident light is rotated by liquid crystal cell 40. When the amount of rotation by which the polarization direction of the incident light is rotated by liquid crystal cell 40 is set in this way, the linear polarizations corresponding to the circular polarizations of the synthesized image and the private image are each halved in luminance as passing through polarizing plate 27 and reach camera 21. At this point, camera 21 integrates the incident light for a certain period so that the private image is superimposed with its reversal image, forming a half-tone (gray) image. Accordingly, camera 21 can photograph the public image alone. Further, when the user selects the public image via display selector 42, the public image is displayed on terminal display unit 24 of receiver 2.

As another method of setting the amount of rotation by which the polarization direction of the incident light is rotated by liquid crystal cell 40 at 45 degrees, there is a method in which liquid crystal cell 40 is changed over at high speed between the off-state and the fully on-state of liquid crystal cell 40. In this case, voltage may and should be applied to liquid crystal cell 40 so that the period in which liquid crystal cell 40 is turned off and the period in which liquid crystal cell 40 is full turned on are equal to each other.

When liquid crystal cell 40 is changed over at high speed between the off-state and the fully on-state in this way, each of the linear polarizations corresponding to circular polarizations of the private image and the synthesized image passes through polarizing plate 27 to reach camera 21 in half the duration of the reading period in which camera 21 reads the incident light. Since camera 21 integrates incident light for a certain period also in this method, the private image is superimposed with its reversal image, forming a half-tone (gray) image. Accordingly, camera 21 can photograph the public image only. Thus, when the user selects the public image by display selector 42, the public image is displayed on terminal display unit 24 of receiver 2.

Figure 10:
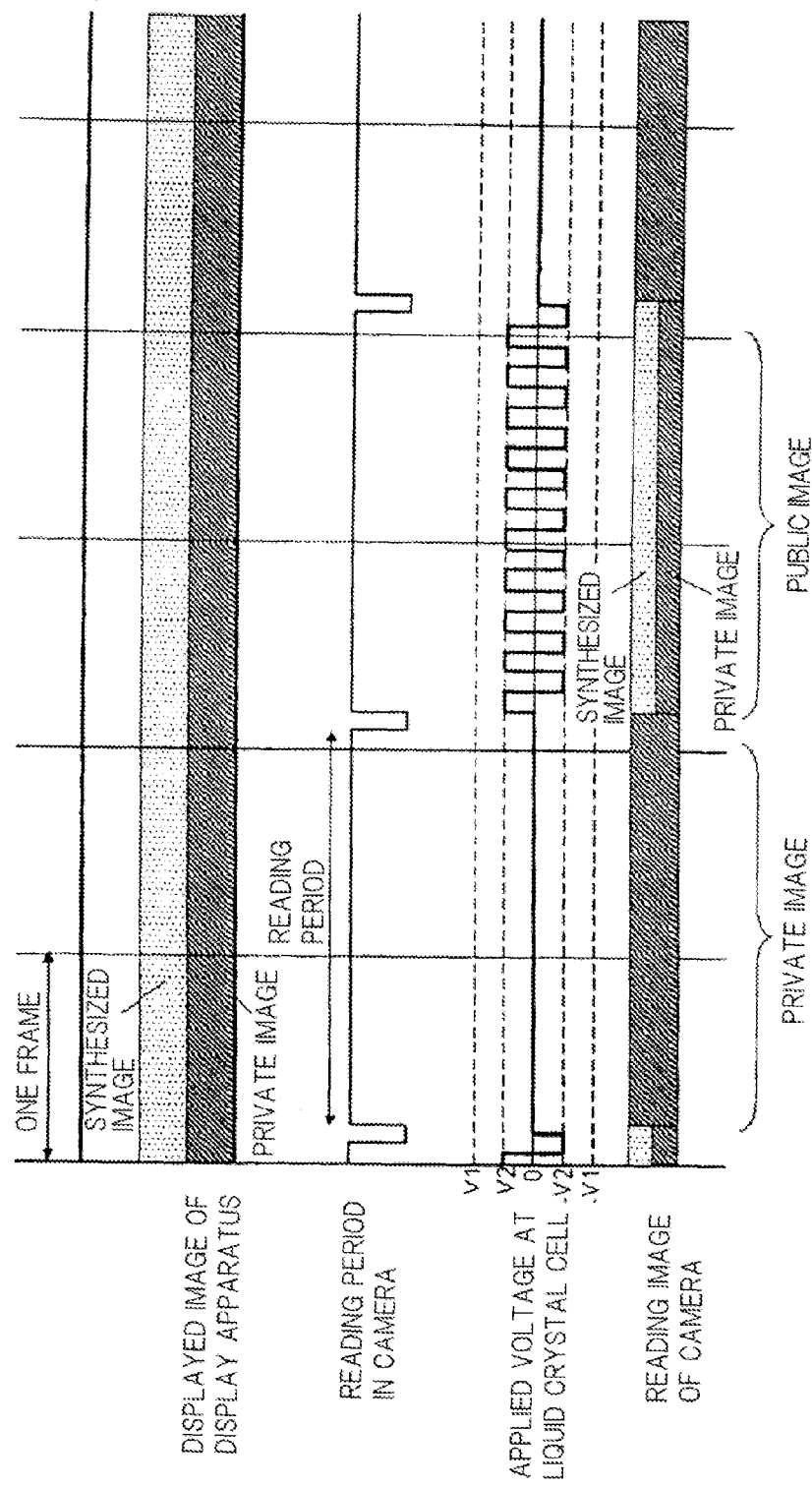
[FIG. 10]
Figure 11:
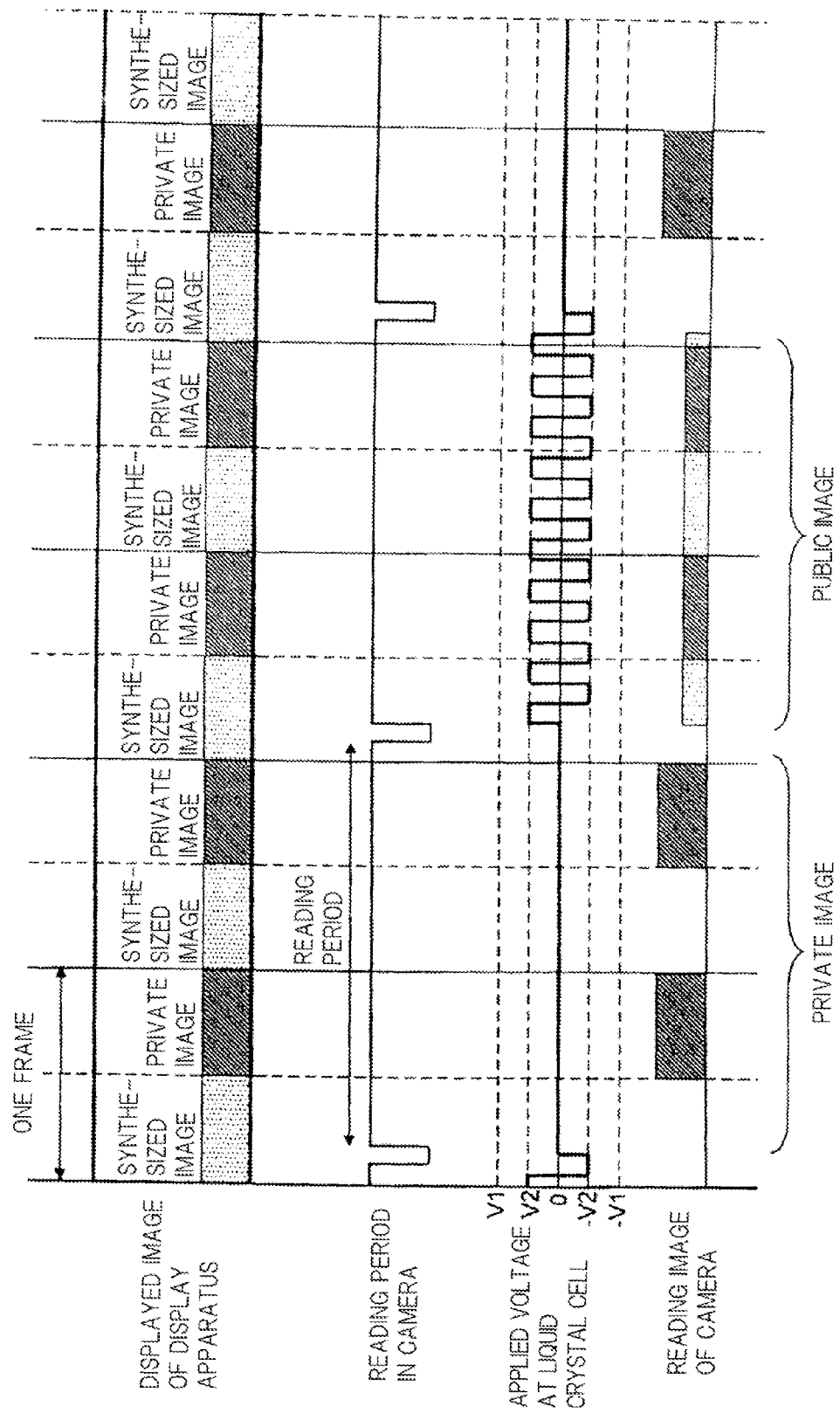
[FIG. 11]

FIGS. 10 and 11 are timing charts showing operational examples of the receiver shown in FIG. 9.

FIGS. 10 and 11 each show one example of an applied voltage waveform when no voltage is applied and when voltage V2 that is half of voltage V1 at which the liquid crystal cell 40 is fully turned on is applied.

FIG. 10 shows an operational example of receiver 2 when display apparatus 1 has a configuration shown in FIG. 3, where the private image is displayed on the screen with left circular polarization and at the same time the synthesized image is displayed with right circular polarization. In this case, the display start timing of one-frame image in display apparatus 1 does not need to coincide with the start timing of the reading interval of camera 21.

In the operational example shown in FIG. 10, when liquid crystal cell 40 is off (in the state where no voltage is applied), the private image alone is incident on and photographed by camera 21, as described above. On the other hand, when liquid crystal cell 40 is on (applied voltage V2), the private image and the synthesized image are halved in luminance, respectively and simultaneously incident on and photographed by the camera. At this point, the private image is superimposed with its reversal image, forming a half-tone (gray) image, so that the public image alone can be photographed.

On the other hand, FIG. 11 shows an operational example of receiver 2 when display apparatus 1 has a configuration shown in FIG. 4, where the private image and the synthesized image are alternately displayed on the screen with left circular polarization and right circular polarization, respectively. Also in this case, the display start timing of one-frame image in display apparatus 1 does not need to coincide with the start timing of the reading interval of camera 21. However, the reading interval at the time of photographing the public image needs to be equal to or longer than one frame period of display apparatus 1 and to be a multiple of the one-frame period.

In the operational example shown in FIG. 11, when liquid crystal cell 40 is off (the state where no voltage is applied), the private image alone is intermittently incident on and photographed by camera 21 as described above. On the other hand, when liquid crystal cell 40 is on (applied voltage V2), the private image and the synthesized image are respectively halved in luminance and alternately incident on and photographed by the camera. During this period, the private image is superimposed with its reversal image, forming a half-tone (gray) image, so that the public image alone can be photographed.

As described above, receiver 2 of the present exemplary embodiment photographs display apparatus 1 which displays the private image and the synthesized image, simultaneously, or alternately, whereby it is possible to selectively display the private image and the public image on terminal display unit 24.

Figure 12:
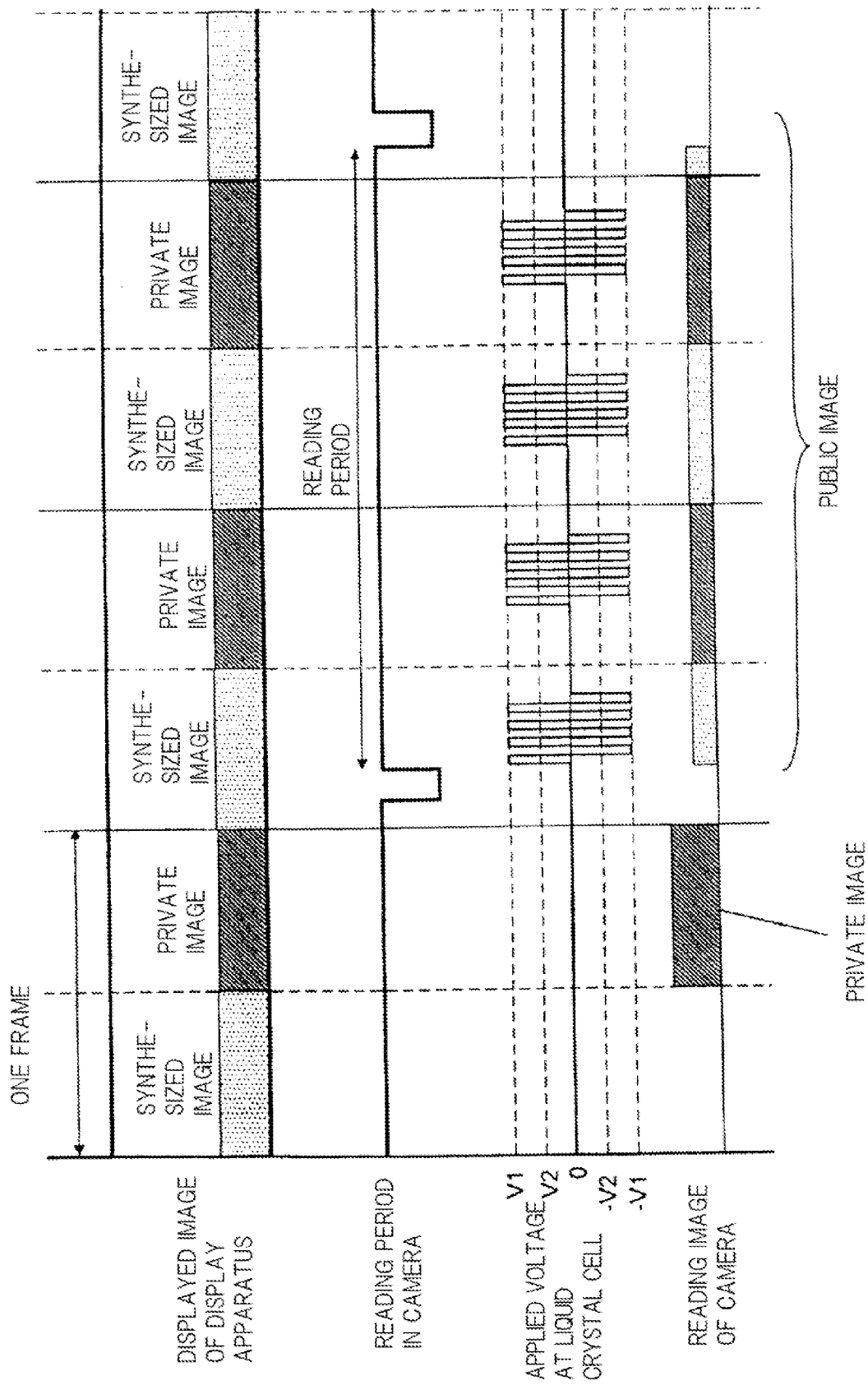
[FIG. 12]

Here, when the response speed of the liquid crystal used for liquid crystal cell 40 is low, instead of using the method of applying voltage V2 that is half of voltage V1 at which the liquid crystal cell 40 is fully turned on, if, for example, an a.c. voltage in which the maximum amplitude (absolute value) is V1 and positive and negative voltages alternate faster than the response time of the liquid crystal, is applied to liquid crystal cell 40 and the application time is set at half the aforementioned reading interval, as shown in FIG. 12, an equivalent operation is achieved.

The foregoing description was made taking an example in which a TN type liquid crystal is used for liquid crystal cell 40. However, the liquid crystal cell may use an electrically controlled birefringence (ECB: Electrically Controlled Birefringence) type or any other liquid crystals, not limited to TN type.

Further, it is possible to use a liquid crystal that produces a phase difference returning a linear polarization to a circular polarization, instead of the liquid crystal that rotates the polarization direction of the incident light 45 degrees when voltage V2 is applied to liquid crystal cell 40.

Figure 13:
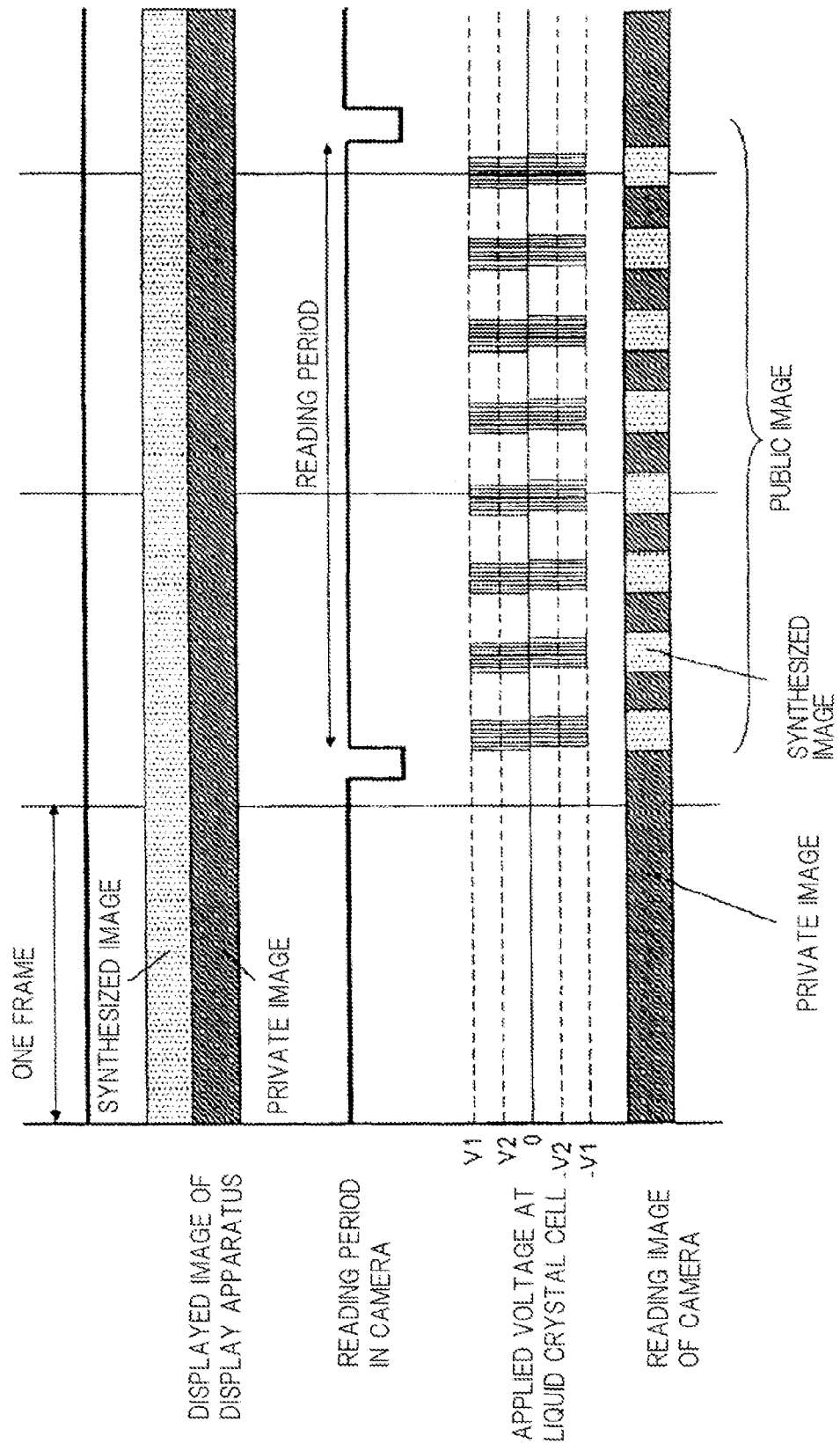
[FIG. 13]
Figure 14:
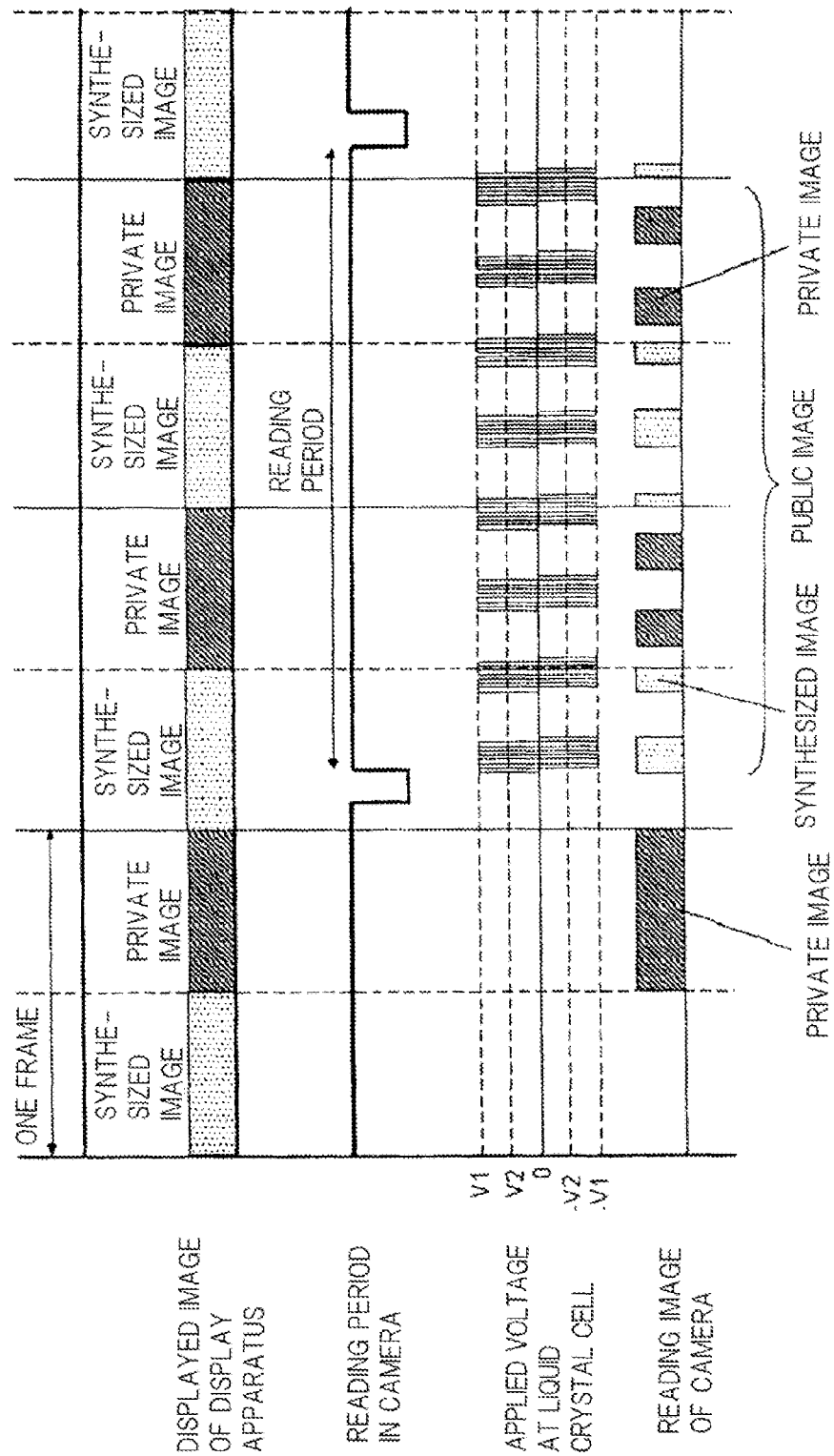
[FIG. 14]

FIGS. 13 and 14 are timing charts showing other operational examples of the receiver shown in FIG. 9.

FIGS. 13 and 14 each show one example of an applied voltage waveform, where a high-speed response liquid crystal is used for liquid crystal cell 40, and an interval in which no voltage is applied and another interval in which voltage V1 that fully turns on liquid crystal cell 40 is applied, are alternately repeated.

FIG. 13 shows an operational example of a receiver when display apparatus 1 has a configuration shown in FIG. 3, where the private image is displayed on the screen with left circularly polarized light and at the same time the synthesized image is displayed with right circularly polarized light. In this case, the display start timing of one-frame image in display apparatus 1 does not need to coincide with the start timing of the reading interval of camera 21.

In the operational example shown in FIG. 13, when liquid crystal cell 40 is off (the state where no voltage is applied), the private image alone is incident on and is photographed by camera 21, as described above. On the other hand, when liquid crystal cell 40 is on (applied voltage V1), the synthesized image is incident on and is photographed by camera 21. At this point, when the state, in which liquid crystal cell 40 is turned on, and the state, in which liquid crystal cell 40 is turned off, are alternated at high speed and when these intervals are equal to each other, the private image and the synthesized image are alternately incident on and photographed by camera 21. In this case, the private image is superimposed with its reversal image, forming a half-tone (gray) image, so that the public image alone can be photographed.

On the other hand, FIG. 14 shows an operational example of receiver 2 when display apparatus 1 has a configuration shown in FIG. 4, where the private image and the synthesized image are alternately displayed on the screen with left circular polarization and right circular polarization, respectively. Also in this case, the display start timing of one-frame image in display apparatus 1 does not need to coincide with the start timing of the reading interval of camera 21. However, the reading interval at the time of photographing the public image needs to be equal to or longer than one frame period of display apparatus 1 and to be a multiple of the one-frame period.

In the operational example shown in FIG. 14, when liquid crystal cell 40 is off (the state where no voltage is applied), the private image alone is intermittently incident on and photographed by camera 21, as described above. When the state, in which liquid crystal cell 40 is turned, and the state, in which liquid crystal cell 40 is turned off, are alternated at high speed and when these intervals are equal to each other, if display apparatus 1 displays the synthesis image and if liquid crystal cell 40 is on, the synthesized image alone is incident on and photographed by camera 21. If display apparatus 1 displays the private image and if liquid crystal cell 40 is off, the private image alone is incident on and photographed by the camera. However, the light incident on camera 21 is integrated for the reading interval, the private image is superimposed with its reversal image, forming a half-tone (gray) image, so that the public image alone can be photographed.

As described above, receiver 2 of the present exemplary embodiment photographs display apparatus 1 which displays the private image and the synthesized image, simultaneously, or alternately, whereby it is possible to selectively display the private image and the public image on terminal display unit 24.

The foregoing description was made taking an example in which a TN type liquid crystal is used for liquid crystal cell 40. However, the liquid crystal cell may use other kinds of liquid crystals presenting high-speed response such as ferroelectric liquid crystal, antiferroelectric liquid crystal, etc, not limited to NT type.

According to the communication system of the second exemplary embodiment, in addition to the same effect as that of the communication systems of the first exemplary embodiment, display of the public image and the private image by receiver 2 can be simply switched, so that convenience for users is improved.

(The Third Exemplary Embodiment)

Next, the third exemplary embodiment of the present invention will be described with reference to the drawings.

In the above second exemplary embodiment, when liquid crystal 40 included in receiver 2 is off, the private image is displayed on terminal display unit 24, whereas when the liquid crystal cell 40 is on, the user views the public image displayed on terminal display unit 24.

It is generally considered that when a user uses receiver 2, there are more chances to display the public image than to display the private image. Therefore, the power consumption of receiver 2 is prone to increase because in receiver 2 of the second exemplary embodiment, voltage needs to be applied to liquid crystal cell 40 when the public image that is displayed frequently is displayed. Because receiver 2 is realized by a portable type terminal device such as a mobile phone as described above, any increase in power consumption brings on exhaustion of the battery in the terminal device, which is not desirable.

Proposed in communication system of the third exemplary embodiment is a receiver 2 that can simply switch the display between the public image and the private image and inhibit any increase in power consumption. Display apparatus 1, transmitter 3 and data server 4 included in the communication system of the third exemplary embodiment have the same configurations and operations as those of the first exemplary embodiment, so that the description is omitted.

Receiver 2 of the third exemplary embodiment, similarly to the second exemplary embodiment, has a configuration in which ¼ wave plate 26, liquid crystal cell 40 and polarizing plate 27 are arranged in such a position so as to cover the light receiver of camera 21. However, in receiver 2 of the third exemplary embodiment, the polarizing direction of polarizing plate 27 is adjusted so as to transmit the linear polarization corresponding to the circular polarization of the private image that has passed through liquid crystal cell 40 and the linear polarization corresponding to the circular polarization of the synthesized image, with their luminance halved when liquid crystal cell 40 is off. Specifically, polarizing plate 27 of the third exemplary embodiment is rotated 45 degree from the polarizing direction of the polarizing plate 27 included in receiver 2 of the second exemplary embodiment, and positioned in the state. The switching controller adjusts the polarization direction by liquid crystal cell 40 by applying voltage to liquid crystal cell 40 such that only the linear polarization corresponding to the circular polarization of the private image will pass through polarizing plate 27 when liquid crystal cell 40 is turned on. The other configuration is the same as that of receiver 2 of the second exemplary embodiment, so that the description is omitted.

In receiver 2 of the third embodiment mode, when liquid crystal cell 40 is off, ¼ wave plate 26 converts the circular polarizations corresponding to the private image and synthesized image into linear polarizations, and each passes through liquid crystal cell 40 with the polarization direction rotated 90 degrees. Here, since polarizing plate 27 is disposed with its polarizing direction rotated 45 degrees, each component is halved in luminance as passing through polarizing plate 27 and reaches camera 21. In this case, terminal display unit 24 displays the same image as display apparatus 1 is viewed by the naked eye, or the public image alone because the private image is superimposed with its reversal image, resulting in a half-tone (gray) image.

On the other hand, when liquid crystal cell 40 is fully turned on, the polarizing direction is rotated 90 degrees from the off-state, so that the linear polarizations corresponding to the circular polarizations of the private image and the synthesized image pass through liquid crystal cell 40, and each component is halved in luminance but passes through polarizing plate 27 and reaches camera 21. To deal with this situation, in the present exemplary embodiment, in order that only the linear polarization corresponding to the circular polarization of the private image will pass through liquid crystal cell 40, the half of the voltage at which the liquid crystal cell 40 is fully turned on is applied from switching controller 41 to liquid crystal cell 40. As the applied voltage to liquid crystal cell 40 is set in this way, only the linear polarization corresponding to the circular polarization of the private image passes through polarizing plate 27 of receiver 2, so that receiver 2 can photograph the private image alone. In this case, when a notice of the private image photographing mode being active is given to private image decoder 23 from switching controller 41, private image decoder 23 implements the necessary signal processing on the image signal of the private image photographed by camera 21.

Figure 15:
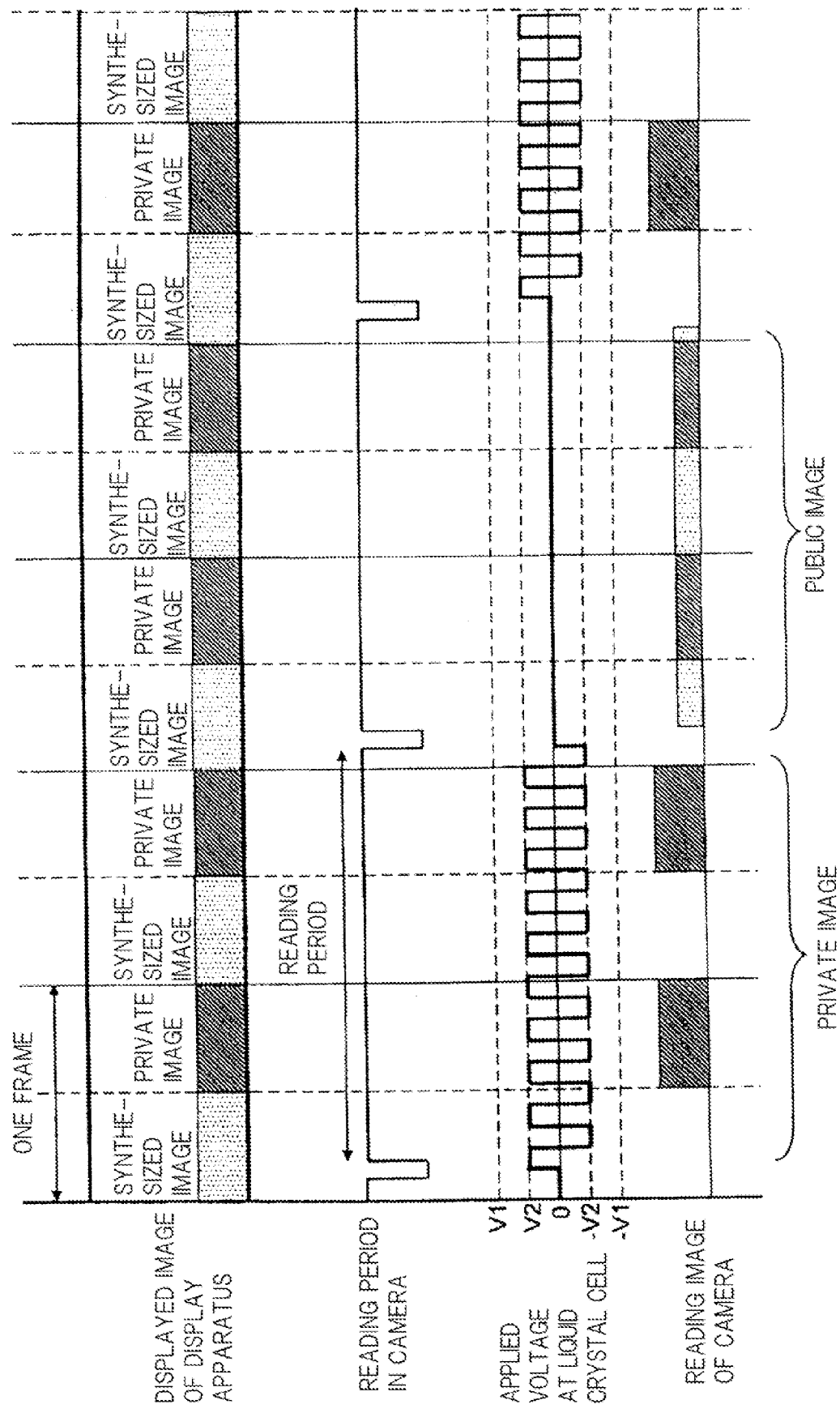
[FIG. 15]
Figure 16:
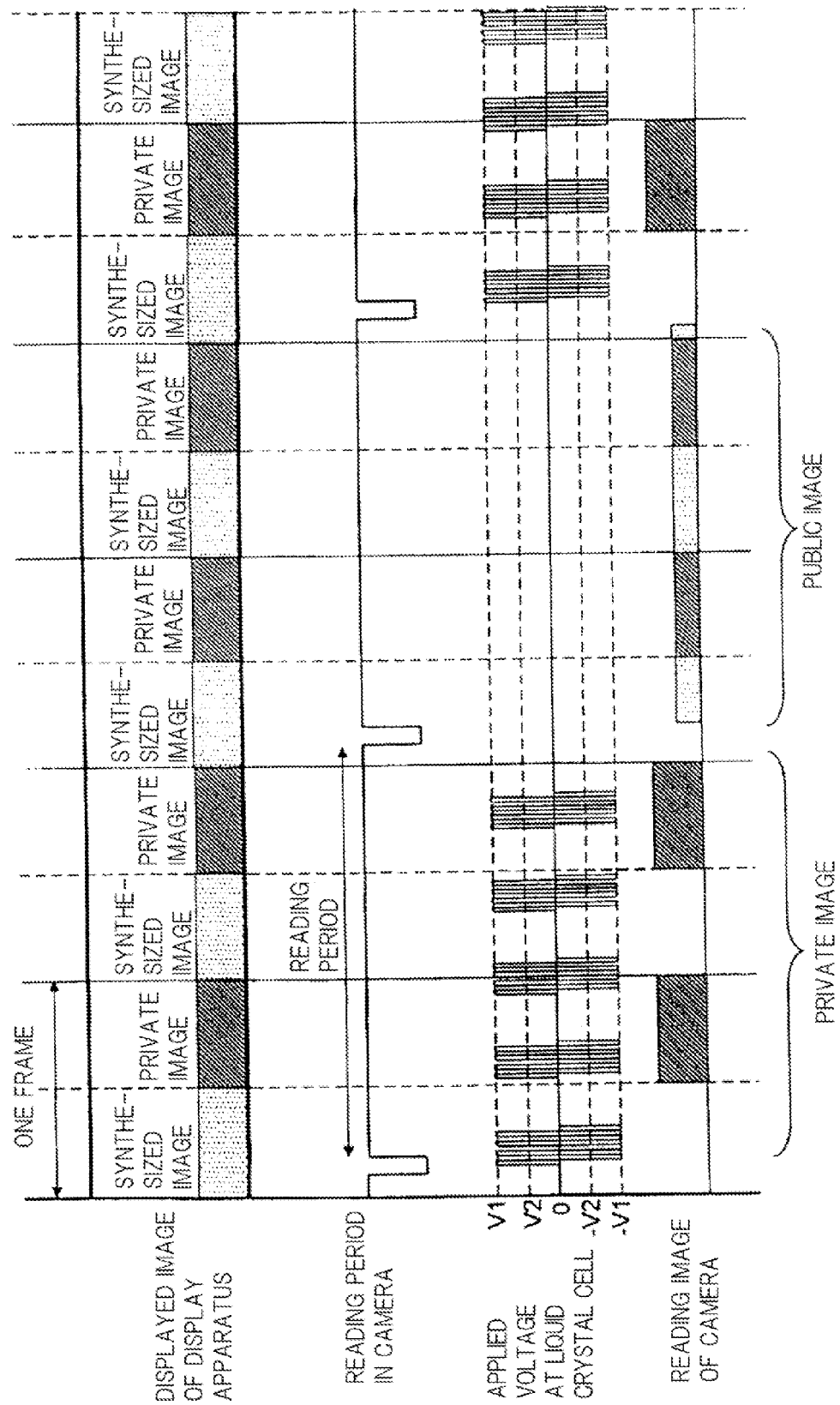
[FIG. 16]

FIGS. 15 and 16 are timing charts showing operational examples of the receiver of the third exemplary embodiment.

FIGS. 15 and 16 show operational example of receiver 2 when display apparatus 1 has a configuration shown in FIG. 4, where the private image is displayed on the screen with left circularly polarized light and at the same time the synthesized image is displayed with right circularly polarized light.

FIGS. 15 and 16 each show one example of an applied voltage waveform for applying the half of the voltage at which the liquid crystal cell 40 is fully turned on. Here, it is assumed that liquid crystal cell 40 is fully turned on when an a.c. voltage having the maximum amplitude (absolute value) V1 is applied.

FIG. 15 is an example of applying an a.c. voltage with the maximum amplitude (absolute value) V2 (=V/2) to liquid crystal cell 40 during the reading interval of the private image. FIG. 16 is an example where the applied voltage (integrated value) is set at the half of the maximum amplitude by applying an a.c. voltage with the maximum amplitude (absolute value) V1 to liquid crystal cell 40 during the reading interval of the private image and setting the application time at the half of the reading interval.

According to the communication system of the third exemplary embodiment, in addition to the same effect as that of the communication system of the second exemplary embodiment, it is possible to expect reduction of power consumption compared to the receiver 2 of the second exemplary embodiment because voltage is applied to liquid crystal cell 40 when the private image is displayed.

Similarly to the second exemplary embodiment, the third exemplary embodiment was described photographing an example where a TN type liquid crystal is used for liquid crystal cell 40. However, liquid crystal cell 40 may use a VA (Vertical Alignment) type liquid crystal which is a liquid crystal aligned in the vertical direction by, for example, vertical alignment film, presenting negative dielectric anisotropy, and makes the incident light have a desired phase difference or rotary polarization when voltage is applied.

(The Fourth Exemplary Embodiment)

Next, the fourth exemplary embodiment of the present invention will be described with reference to the drawings.

Figure 17:
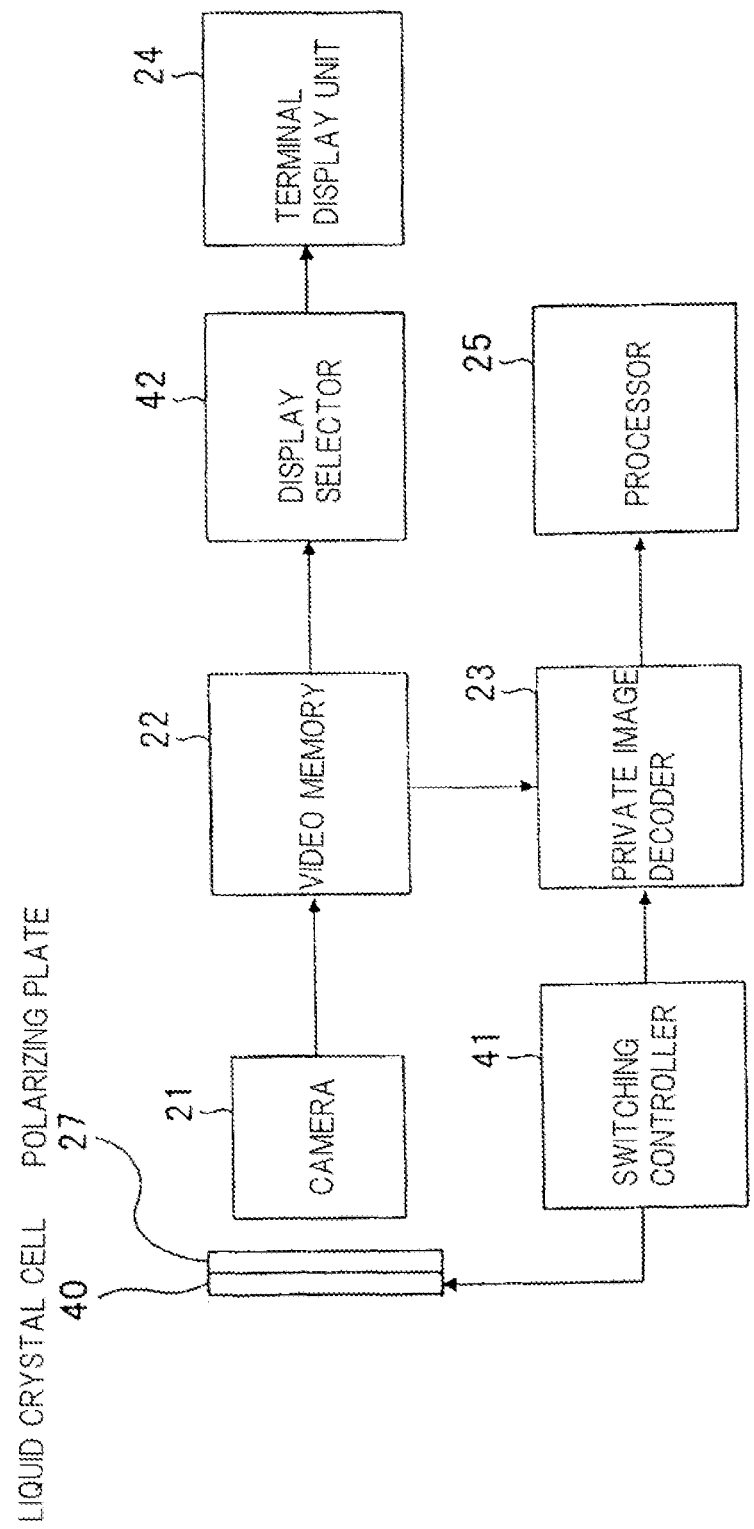
[FIG. 17]

FIG. 17 is a block diagram showing one configurational example of receiver 2 included in a communication system of the fourth exemplary embodiment.

Receiver of the fourth exemplary embodiment has liquid crystal cell 40 and polarizing plate 27 arranged such a position as to cover the light receiver of camera 21. The other structure is the same as the receiver of the second exemplary embodiment, so that the description is omitted. Display apparatus 1, transmitter 3 and data server 4 included in the communication system of the fourth exemplary embodiment have the same configurations and operations as those of the first exemplary embodiment, so that the description is omitted.

Receiver 2 of the fourth exemplary embodiment is configured such that liquid crystal cell 40 has a function of ¼ wave plate. Liquid crystal cell 40 employs an electrically controlled birefringence (ECB: Electrically Controlled Birefringence) type liquid crystal, for example, and is prepared with birefringent indexes so as to function as a ¼ wave plate when no voltage is applied. When voltage is fully applied to the thus prepared liquid crystal cell 40, the liquid crystal alignment is oriented almost upright, so that the incident light passes through liquid crystal cell 40 without changing its polarization state.

For example, when the synthesized image made of the public image and the reversal image is displayed on screen 12 of display apparatus 1 by right circular polarization and the private image is displayed by left circular polarization, liquid crystal cell 40 functions as a ¼ wave plate when no voltage applied to liquid crystal cell 40 so that the right circular polarization and the left circular polarization are converted into respective linear polarizations. Accordingly, arranging polarizing plate 27 in such a manner that only the linear polarization corresponding to the left circular polarization can transmit therethrough, enables receiver 2 to photograph the private image alone.

When voltage is applied to liquid crystal cell 40, the right circular polarization and the left circular polarization pass through the liquid crystal cell 40 as they are. Accordingly, the components of the right circular polarization and the left circular polarization pass through polarizing plate 27 half-and-half. As a result, camera 21 can photograph the same image as that when people view display apparatus 1 with the naked eye.

On the other hand, when a VA type liquid crystal for liquid crystal cell 40 is used, the liquid crystal alignment is oriented almost upright when no voltage is applied. Therefore, the incident light passes through the cell with its polarization state little changed. Further, since the liquid crystal alignment of the VA type liquid crystal inclines when enough high voltage is applied, the emitted light is converted into a linear polarization when the incident light is circularly polarized light.

For example, when the synthesized image made of the public image and the reversal image is displayed on the screen of display apparatus 1 by right circular polarization and the private image is displayed by left circular polarization, the right circular polarization and the left circular polarization are converted into respective linear polarizations when voltage is applied to liquid crystal cell 40. Accordingly, arranging polarizing plate 27 in such a manner that only the linear polarization corresponding to left circular polarization can pass therethrough, enables receiver 2 to photograph the private image alone.

When no voltage is applied to liquid crystal cell 40, the right circular polarization and the left circular polarization pass through liquid crystal cell 40 as they are. In this case, the components of the right circular polarization and the left circular polarization pass through polarizing plate 27 half-and-half, so that receiver 2 can photograph the same image as that when people view display apparatus 1 with the naked eye.

According to the communication system of the fourth exemplary embodiment, in addition to the same effect as that of the communication systems of the second exemplary embodiment and the third exemplary embodiment, ¼ wave plate 26 are no longer necessary, so that it is possible to alleviate cost increase of receiver 2.

Also, similar communication systems can be constructed by using a liquid crystal that operates in a mechanism other than the above-described one, for liquid crystal cell 40. Further, the direction of arrangement of polarizing plate 27 and the method of driving liquid crystal cell 40 can be configured as appropriate using well-known technologies in combination.

As the present invention has been described heretofore by referring to exemplary embodiments, the present invention should not be limited to the above exemplary embodiments. Various changes that will be understood by those skilled in the art can be added to the configurations and details of the present invention within the scope of the present invention.

The invention claimed is:

1. A communication system comprising:
   a transmitter that outputs an image signal for displaying a first image and outputs an image signal of a synthesized image made of the reversal image of the first image and a second image;
   a display apparatus that, based on the image signals output from the transmitter, displays the first image and the synthesized image with circular polarizations having different senses of rotation from each other; and,
   a receiver including a circular polarization selecting and transmitting means that separates the first image and the synthesized image displayed on the display apparatus, based on the sense of rotation of the circular polarization, and selectively allows the images to pass therethrough, so as to be able to photograph the first image displayed on the display apparatus.

2. The communication system according to claim 1, wherein the circular polarization selecting and transmitting means includes:
   a ¼ wave plate that converts the circular polarizations of the first image and the synthesized image displayed on the display apparatus into linear polarizations; and,
   a polarizing plate that passes through only the linear polarization corresponding to the circular polarization of the first image.

3. The communication system according to claim 1, wherein the circular polarization selecting and transmitting means includes:
   a ¼ wave plate that converts the circular polarizations of the first image and the synthesized image displayed on the display apparatus into linear polarizations;
   a liquid crystal cell that switches the polarization direction of a linear polarization having passed through the ¼ wave plate, depending on the state of voltage being applied or the state of no voltage being applied;
   a polarizing plate that passes through only the linear polarization corresponding to the circular polarization of the first image having passed through the liquid crystal cell or that passes through both the linear polarization corresponding to the circular polarization of the first image and the linear polarization corresponding to the circular polarization of the synthesized image; and,
   a switching controller that applies a predetermined voltage to the liquid crystal cell.

4. The communication system according to claim 3, wherein the polarizing cell is arranged with such a polarizing direction as to pass through only the linear polarization corresponding to the circular polarization of the first image having passed through the liquid crystal cell, in a state where the voltage is not applied to the liquid crystal cell, and
   the switching controller applies voltage to the liquid crystal cell such that the linear polarization corresponding to the circular polarization of the first image, and the linear polarization corresponding to the circular polarization of the synthesized image, whose polarization directions have been varied by the liquid crystal cell, will pass through the polarizing plate with luminance halved respectively.

5. The communication system according to claim 3, wherein the polarizing cell is arranged with such a polarizing direction as to pass through only the linear polarization corresponding to the circular polarization of the first image having passed through the liquid crystal cell, in a state where the voltage is not applied to the liquid crystal cell, and
   the switching controller applies voltage to the liquid crystal cell such that the linear polarization corresponding to the circular polarization of the first image, and the linear polarization corresponding to the circular polarization of the synthesized image, whose polarization directions have been varied by the liquid crystal cell, will pass through the polarizing plate, during different halves of the reading interval for reading the incident light.

6. The communication system according to claim 3, wherein the polarizing plate is arranged with such a polarizing direction as to pass through each of the linear polarization corresponding to the circular polarization of the first image, and the linear polarization corresponding to the circular polarization of the synthesized image, having passed through the liquid crystal cell, with halved luminance,
   the switching controller applies voltage to the liquid crystal cell so that only the linear polarization corresponding to the circular polarization of the first image, whose polarization direction has been varied by the liquid crystal cell will pass therethrough.

7. The communication system according to claim 1, wherein the circular polarization selecting and transmitting means includes:
   a liquid crystal cell that passes through the first image and the synthesized image displayed on the display apparatus therethrough without changing the states of polarization, or converts the circular polarizations of the first image and the synthesized image displayed on the display apparatus to linear polarizations, depending on the state of voltage being applied or the state of no voltage being applied;
   a polarizing plate that passes through only the linear polarization corresponding to the circular polarization of the first image having passed through the liquid crystal cell, or passes through both the linear polarization corresponding to the circular polarization of the first image and the linear polarization corresponding to the circular polarization of the synthesized image; and,
   a switching controller that applies a predetermined voltage to the liquid crystal cell.

8. The communication system according to claim 7, wherein the liquid crystal cell is an electrically controlled birefringence type,
   the polarizing plate is arranged with such a direction as to pass through only the linear polarization corresponding to the circular polarization of the first image having passed through the liquid crystal cell when the voltage is not applied to the liquid crystal cell, the switching controller applies voltage to the liquid crystal cell so that the linear polarization corresponding to the circular polarization of the first image and the linear polarization corresponding to the circular polarization of the synthesized image, whose polarization directions have been changed by the liquid crystal cell, will pass through the polarizing plate with luminance halved.

9. The communication system according to claim 7, wherein the liquid crystal cell is of a VA type liquid crystal, the polarizing plate is arranged with such a polarizing direction as to pass through each of the linear polarization corresponding to the circular polarization of the first image, and the linear polarization corresponding to the circular polarization of the synthesized image, having passed through the liquid crystal cell, with halved luminance, the switching controller apply voltage to the liquid crystal cell so that only the linear polarization corresponding to the circular polarization of the first image, whose polarization direction has been varied by the liquid crystal cell will pass therethrough.

10. A receiver that images a first image, and a synthesized image made of the reversal image of the first image and a second image, displayed on a display apparatus with circular polarizations having different senses of rotation from each other and acquires the first image, comprising:

a ¼ wave plate that converts the circular polarizations of the first image and the synthesized image displayed on the display apparatus into linear polarizations; and, a polarizing plate that passes through the linear polarization corresponding to the circular polarization of the first image alone.

11. A receiver that photographs a first image, and a synthesized image made of the reversal image of the first image and a second image, displayed on a display apparatus with circular polarizations having different senses of rotation from each other to acquire the first image, comprising:

a ¼ wave plate that converts the circular polarizations of the first image and the synthesized image displayed on the display apparatus into linear polarizations;

a liquid crystal cell that switches the polarization direction for linear polarizations having passed through the ¼ wave plate, depending on the state of voltage being applied or the state of no voltage being applied;

a polarizing plate that passes through only the linear polarization corresponding to the circular polarization of the first image having passed through the liquid crystal cell, or passes through both the linear polarization corresponding to the circular polarization of the first image and the linear polarization corresponding to the circular polarization of the synthesized image; and, a switching controller that applies a predetermined voltage to the liquid crystal cell.

12. The receiver according to claim 11, wherein the polarizing plate is arranged with such a direction as to pass through only the linear polarization corresponding to the circular polarization of the first image having passed through the liquid crystal cell when the voltage is not applied to the liquid crystal cell, the switching controller applies voltage to the liquid crystal cell so that the linear polarization corresponding to the circular polarization of the first image and the linear polarization corresponding to the circular polarization of the synthesized image, whose polarization directions have been changed by the liquid crystal cell, will pass through the polarizing plate with luminance halved.

13. The receiver according to claim 11, wherein the polarizing plate is arranged with such a polarizing direction as to pass through each of the linear polarization corresponding to the circular polarization of the first image, and the linear polarization corresponding to the circular polarization of the synthesized image, having passed through the liquid crystal cell, with halved luminance, the switching controller applies voltage to the liquid crystal cell so that only the linear polarization corresponding to the circular polarization of the first image, whose polarization direction has been varied by the liquid crystal cell will pass therethrough.

14. A receiver that photographs a first image, and a synthesized image made of the reversal image of the first image and a second image, displayed on a display apparatus with circular polarizations having different senses of rotation from each other to acquire the first image, comprising:

a liquid crystal cell that passes through the first image and the synthesized image displayed on the display apparatus therethrough without changing the states of polarization, or converts the circular polarizations of the first image and the synthesized image displayed on the display apparatus to linear polarizations, depending on the state of voltage being applied or the state of no voltage being applied;

a polarizing plate that passes through only the linear polarization corresponding to the circular polarization of the first image having passed through the liquid crystal cell, or passes through both the linear polarization corresponding to the circular polarization of the first image and the linear polarization corresponding to the circular polarization of the synthesized image; and, a switching controller that applies a predetermined voltage to the liquid crystal cell.

15. The receiver according to claim 14, wherein the polarizing plate is arranged with such a direction as to pass through only the linear polarization corresponding to the circular polarization of the first image having passed through the liquid crystal cell when the voltage is not applied to the liquid crystal cell, the switching controller applies voltage to the liquid crystal cell so that the linear polarization corresponding to the circular polarization of the first image and the linear polarization corresponding to the circular polarization of the synthesized image, whose polarization directions have been changed by the liquid crystal cell, will pass through the polarizing plate with luminance halved.

16. The receiver according to claim 14, wherein the liquid crystal cell is of a VA type liquid crystal, the polarizing plate is arranged with such a polarizing direction as to pass through each of the linear polarization corresponding to the circular polarization of the first image, and the linear polarization corresponding to the circular polarization of the synthesized image, having passed through the liquid crystal cell, with halved luminance, the switching controller applies voltage to the liquid crystal cell so that only the linear polarization corresponding to the circular polarization of the first image, whose polarization direction has been varied by the liquid crystal cell will pass therethrough.

* * * * *